(12) United States Patent
Almond et al.

(10) Patent No.: US 7,950,335 B1
(45) Date of Patent: May 31, 2011

(54) UTILITY TRAY FOR TRIPOD

(76) Inventors: William Chase Almond, Kennedale, TX (US); Steven Scott Collins, Kennedale, TX (US)

( * ) Notice: Subject to any disclaimer, the term of this patent is extended or adjusted under 35 U.S.C. 154(b) by 0 days.

(21) Appl. No.: 12/398,261

(22) Filed: Mar. 5, 2009

(51) Int. Cl.
*A47B 23/00* (2006.01)

(52) U.S. Cl. .............. 108/42; 108/152; 108/26

(58) Field of Classification Search .......... 108/42, 108/26, 25, 152, 157.13; 248/444, 459
See application file for complete search history.

(56) References Cited

U.S. PATENT DOCUMENTS

| | | | |
|---|---|---|---|
| 1,293,237 A | | 2/1919 | Stovall |
| 1,422,397 A | * | 7/1922 | Watson ............ 108/26 |
| 1,897,717 A | * | 2/1933 | Appel ............. 108/26 |
| 1,903,994 A | * | 4/1933 | Goldman .......... 108/26 |
| 1,938,964 A | * | 12/1933 | Hogue ............. 108/26 |
| 2,244,861 A | | 11/1940 | Walker, Sr |
| 2,508,802 A | * | 5/1950 | Schade ............ 108/26 |
| 2,649,972 A | * | 8/1953 | Weil .............. 108/152 |
| 2,683,639 A | * | 7/1954 | Brenny ............ 108/26 |
| 2,984,443 A | | 10/1958 | Bergengren |
| 3,083,053 A | | 3/1963 | Dorsey |
| 3,899,982 A | * | 8/1975 | Fetzek ............ 108/25 |
| 4,117,825 A | | 10/1978 | Robertson |
| 4,122,955 A | | 10/1978 | Celms |
| 4,159,071 A | * | 6/1979 | Roca ............. 108/42 |
| 4,375,881 A | | 3/1983 | Mitchell |
| 4,427,391 A | * | 1/1984 | Berman .......... 108/26 |
| 4,501,438 A | | 2/1985 | McKee |
| 4,735,152 A | | 4/1988 | Bricker |
| 4,805,867 A | | 2/1989 | McAllister |
| 4,896,611 A | | 1/1990 | Lorenzini |
| 4,915,035 A | | 4/1990 | Clark et al. |
| 4,953,716 A | | 9/1990 | Rapoport |
| 5,188,089 A | | 2/1993 | Hamilton |
| D403,186 S | | 12/1998 | Kopish |
| 5,845,585 A | * | 12/1998 | Meeus et al. ..... 108/44 |
| 5,860,534 A | * | 1/1999 | Minneman et al. ..... 108/25 |
| D407,587 S | | 4/1999 | Grabowski |
| 6,029,940 A | * | 2/2000 | Klein .......... 248/346.04 |
| 6,036,158 A | | 3/2000 | Raasch |
| 6,062,145 A | | 5/2000 | Lin |
| 6,065,251 A | | 5/2000 | Kindrick |
| 6,240,857 B1 | | 6/2001 | Elizer |
| 6,253,399 B1 | | 7/2001 | Wagner |
| 6,474,244 B1 | * | 11/2002 | Karpinski ....... 108/42 |
| 6,591,762 B1 | | 7/2003 | Haghayegh |
| 6,705,240 B2 | * | 3/2004 | Block et al. ..... 108/25 |
| D552,152 S | | 10/2007 | Almond |
| 7,503,265 B1 | * | 3/2009 | Hammond ....... 108/26 |
| 7,516,704 B2 | * | 4/2009 | Snider et al. .... 108/25 |
| 2005/0039639 A1 | * | 2/2005 | Espenschied .... 108/25 |
| 2008/0053344 A1 | | 3/2008 | Almond |

FOREIGN PATENT DOCUMENTS

FR 2579433 A1 10/1986
GB 2141922 A 1/1985

* cited by examiner

*Primary Examiner* — José V Chen
(74) *Attorney, Agent, or Firm* — James E. Walton; Richard G. Eldredge

(57) ABSTRACT

A removable tray assembly is disclosed for use with a tripod or easel. The tray assembly includes a shelf having a back edge, a front edge, and two side edges. The tray assembly also includes a pair of support tabs spaced from the back edge of the shelf by respective slots. The removable tray is attached to two legs of the tripod, with one leg passing through each slot. The support tabs contact the side of the tripod legs opposite the shelf and thereby support the shelf in a cantilever fashion.

11 Claims, 26 Drawing Sheets

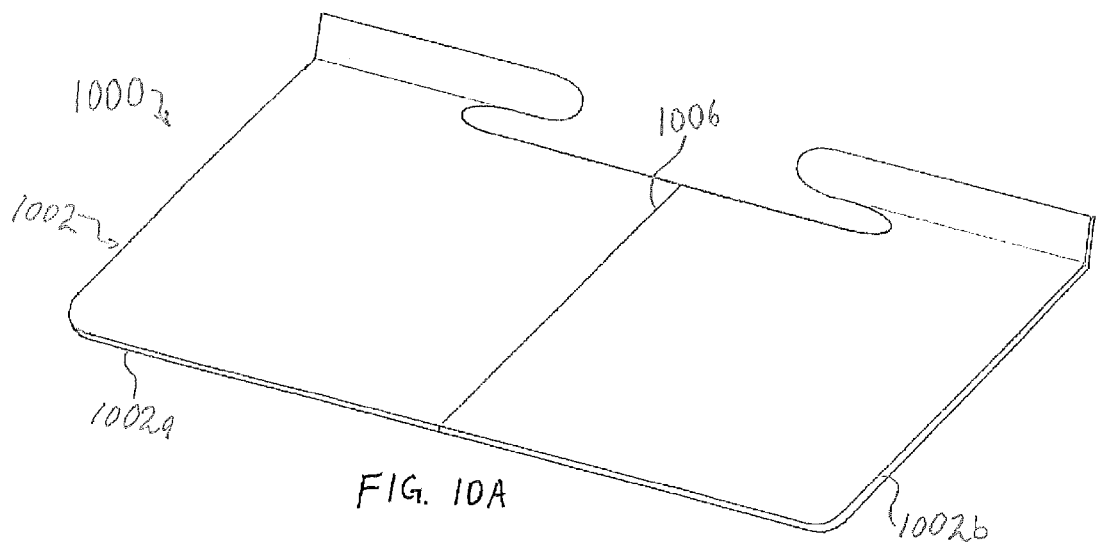
FIG. 10A
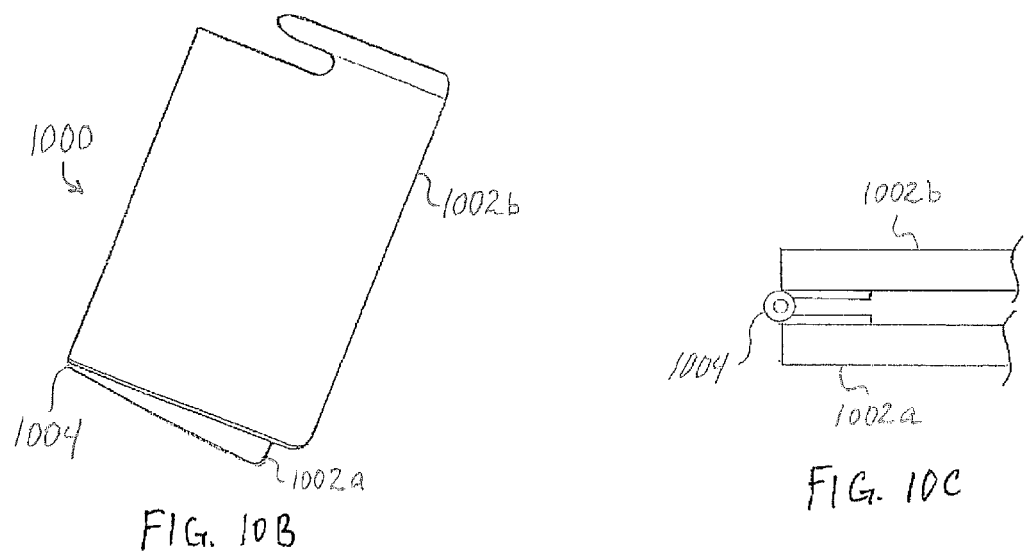
FIG. 10B
FIG. 10C

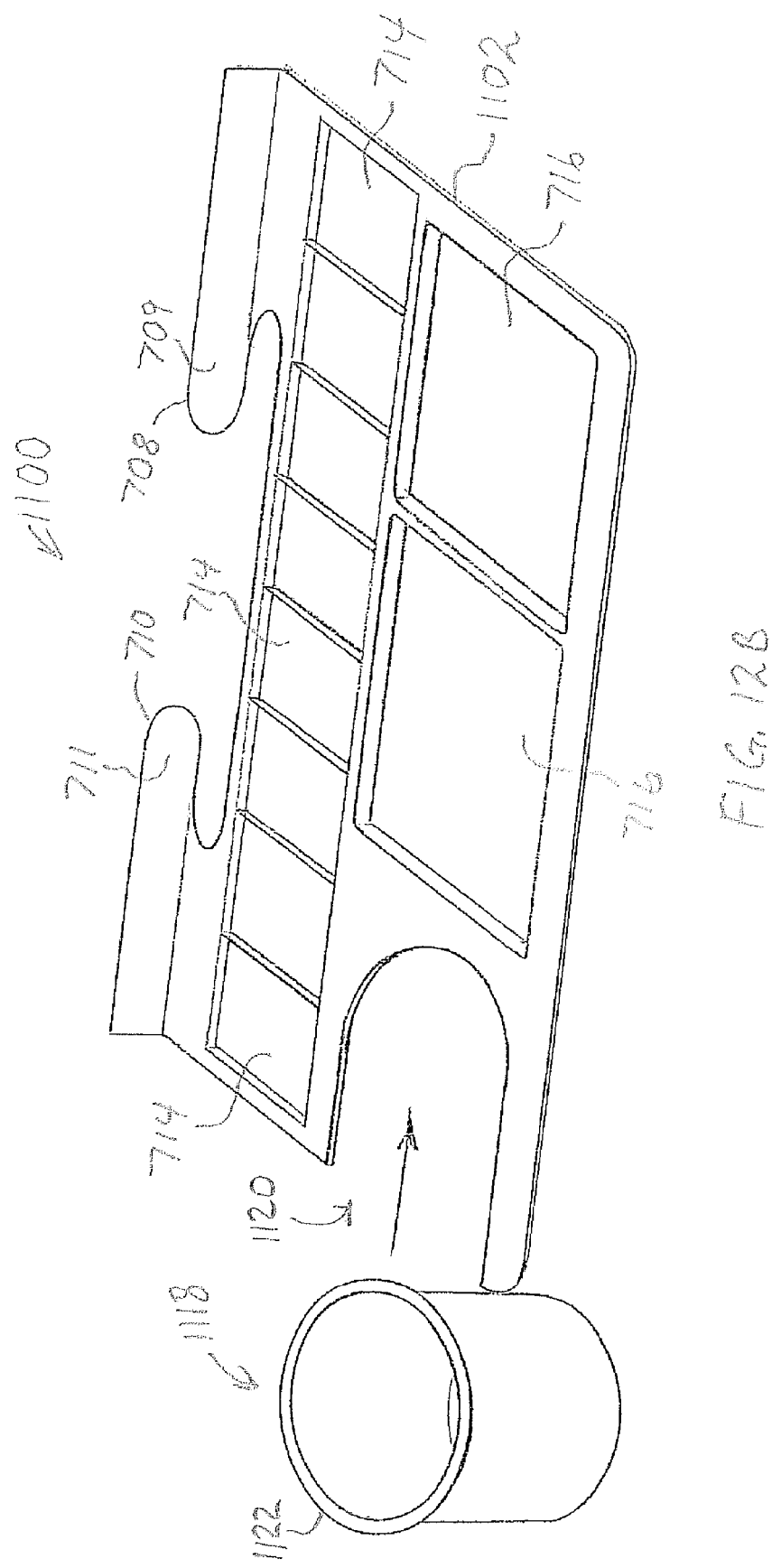

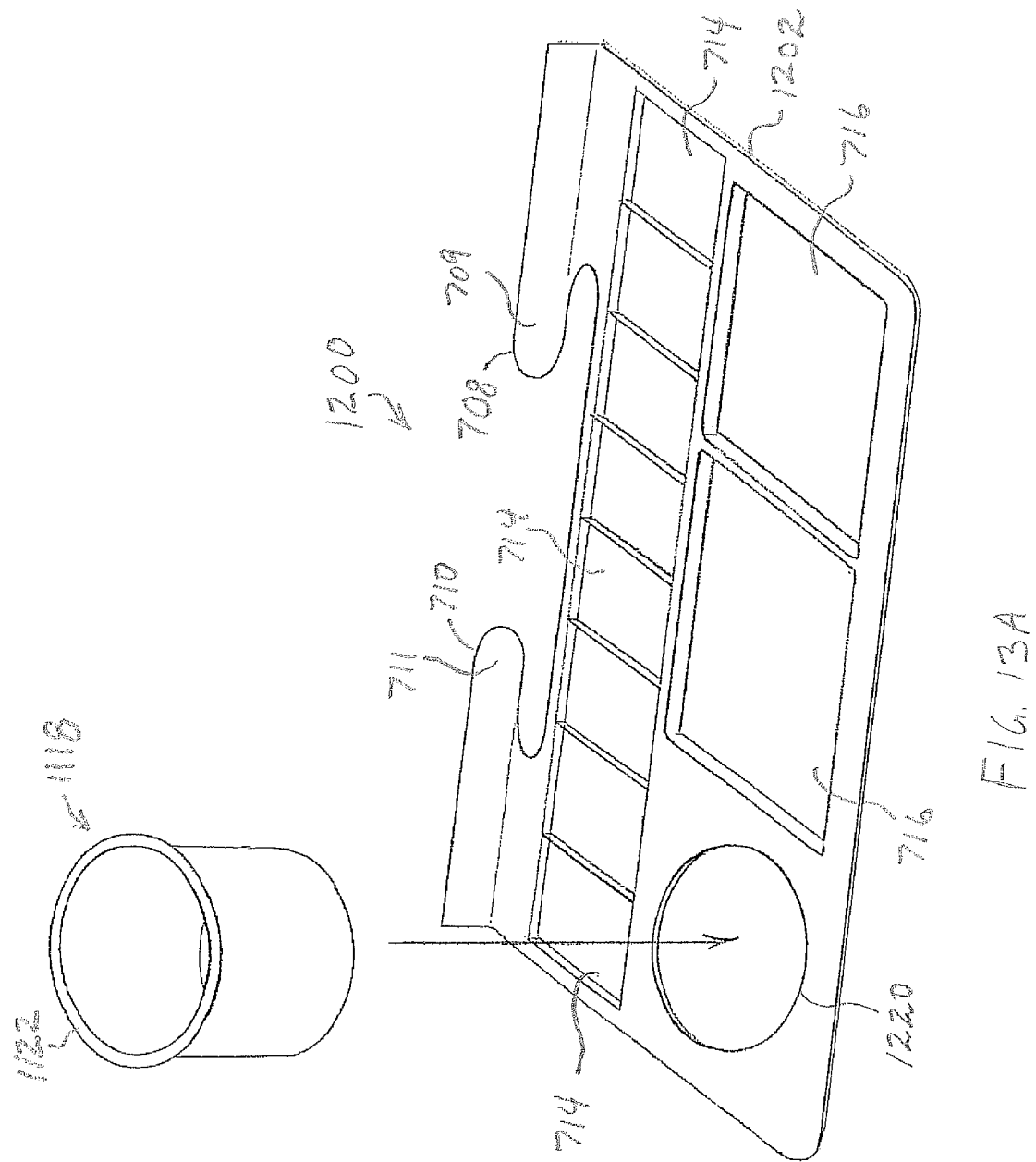

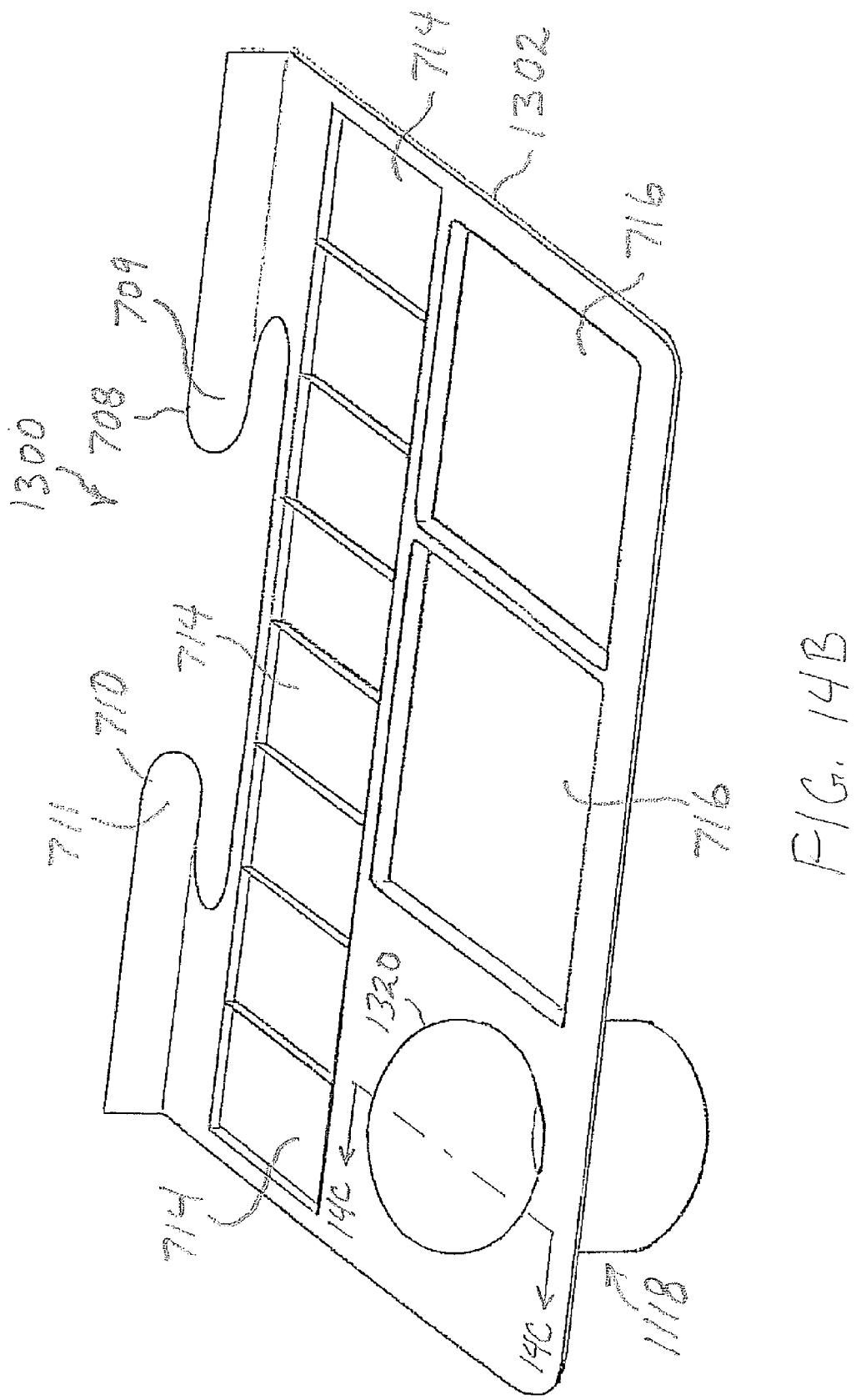

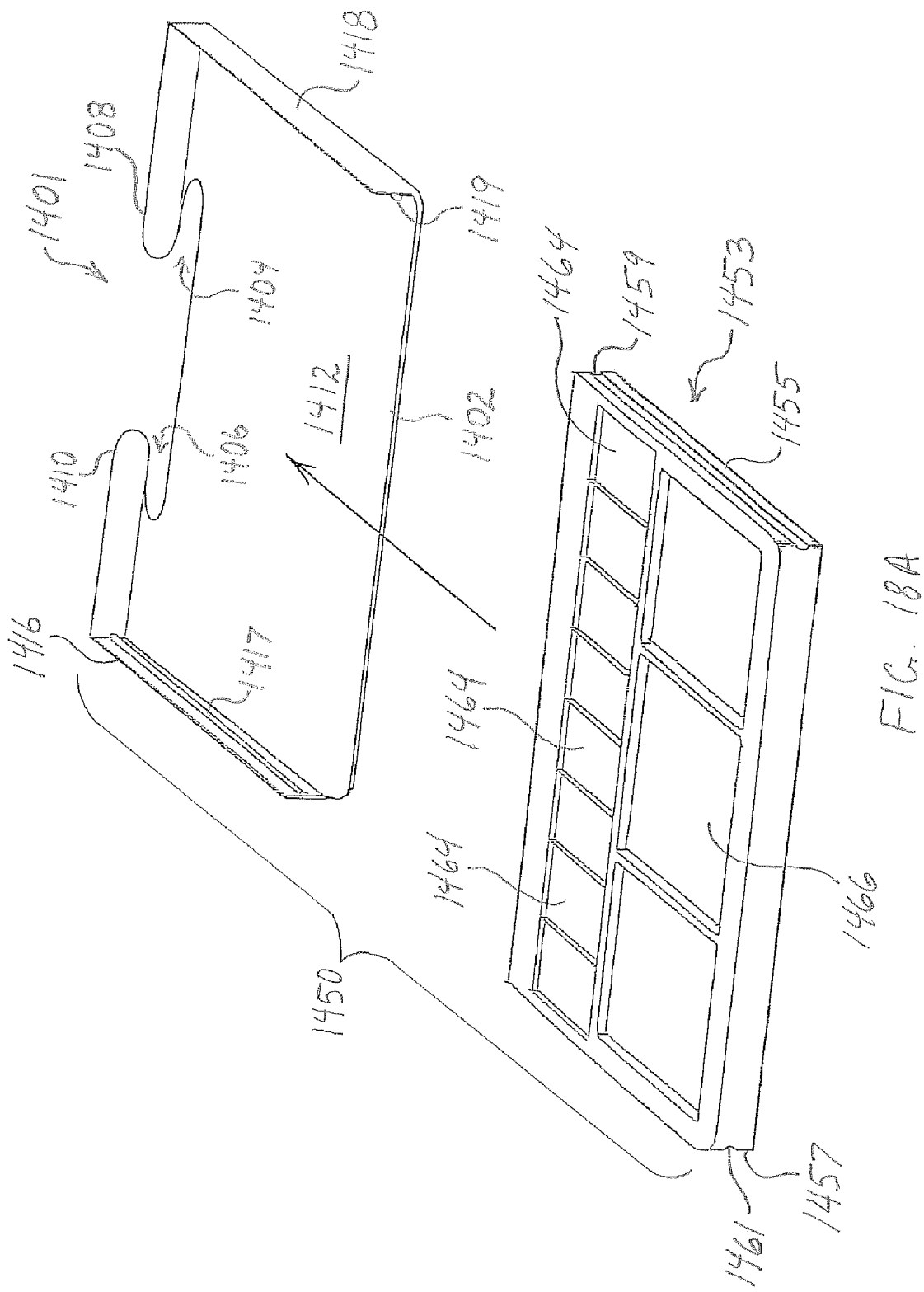

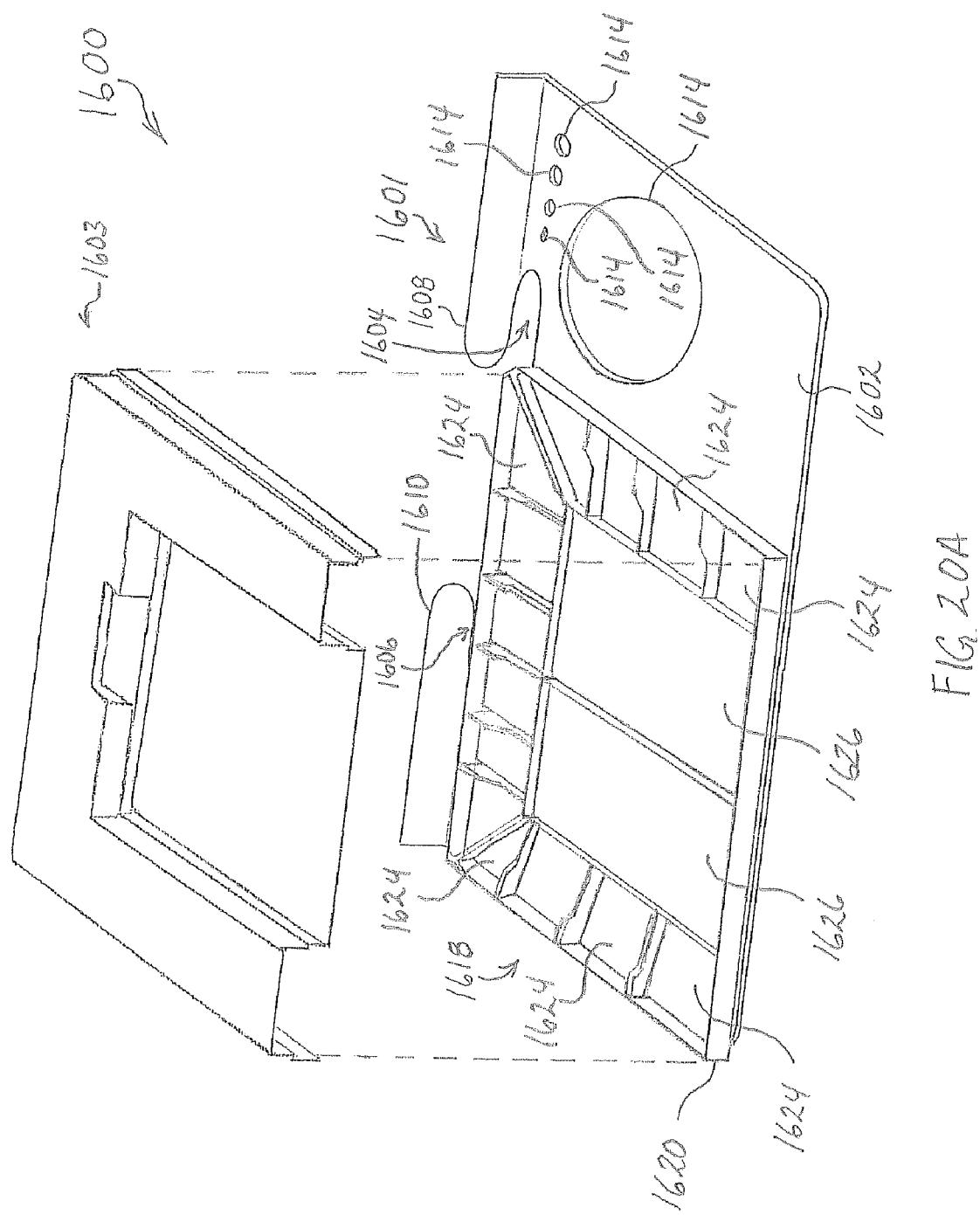

UTILITY TRAY FOR TRIPOD

BACKGROUND

1. Field of the Invention

This invention relates in general to removable shelves or trays for use with portable tripods and easels.

2. Description of Related Art

Tripods have been in widespread use for many years. They are commonly used as a support for a number of different applications. For example, tripods are often used for cameras, telescopes, and easels. Many such tripods are designed to be collapsible and easily portable. As a result, these tripods do not typically include any type of permanently-attached shelf or storage tray despite the usefulness that a shelf or tray would provide.

Because of this common shortcoming, various removable shelves have been introduced. For example, U.S. Pat. No. 6,240,857 to Elizer discloses a removable shelf assembly for use with a tripod or easel. However, the Elizer removable shelf requires support arms and clamps that add to the expense and complexity of the removable shelf. Thus, there remains a need in the art for a simple, inexpensive removable shelf that can be used with a tripod.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIGS. 10A-10C show an alternative tray assembly that is collapsible;

FIGS. 12A-12B show perspective views of an alternative tray assembly comprising a plurality of wells and a removable cup;

FIGS. 14A-14C show perspective views of an alternative tray assembly comprising a plurality of wells and a removable cup;

FIGS. 18A-18B show perspective views of another tray assembly comprising the base portion shown in FIGS. 17A-17B with an alternative slidably removable container;

FIGS. 20A-20B show perspective views of an alternative tray assembly comprising wells, holes, and a removable cover.

DETAILED DESCRIPTION OF THE PREFERRED EMBODIMENT

Figure 1:
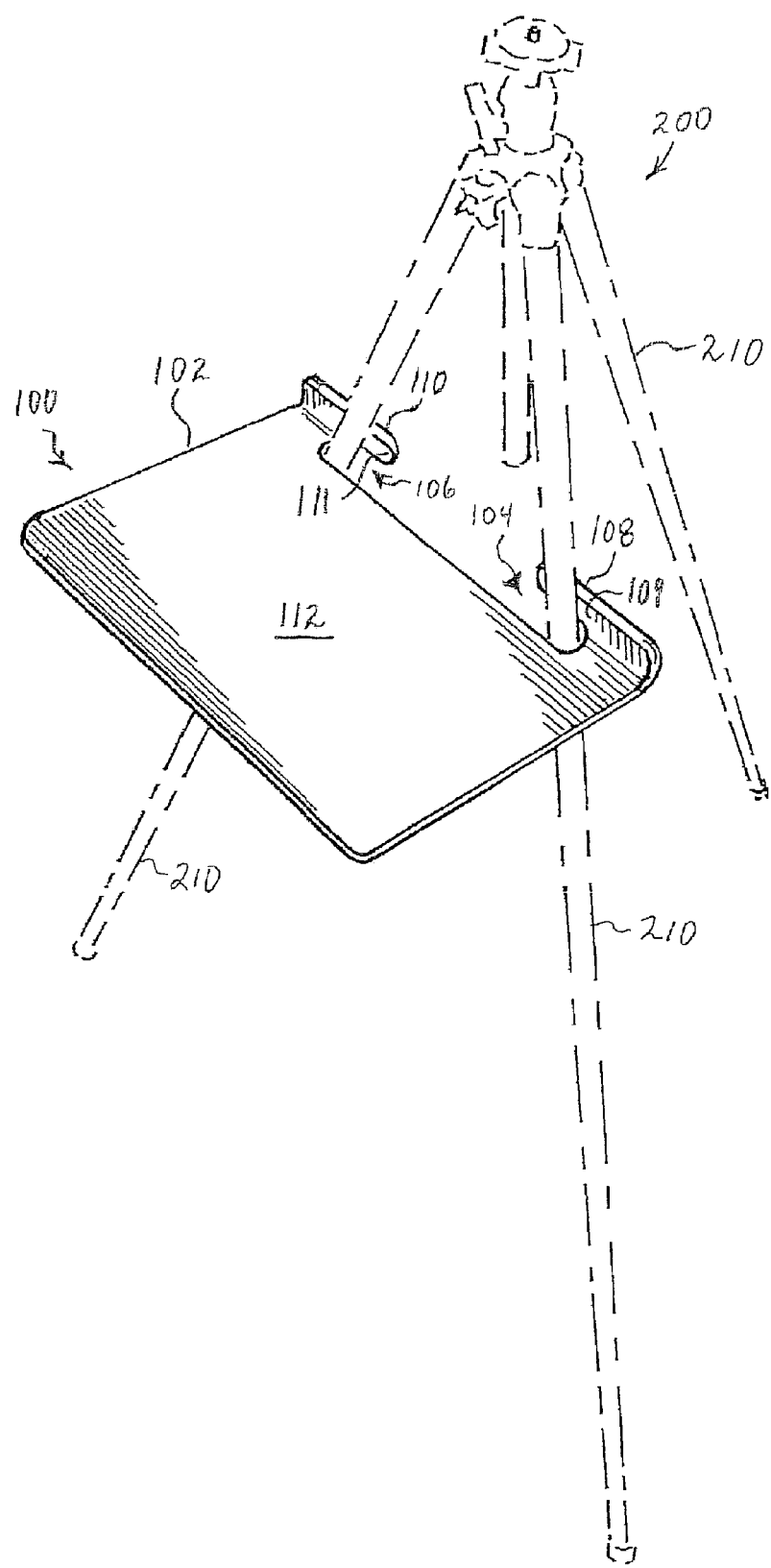
FIG. 1 shows a perspective view of a removable tray assembly according to the present disclosure.
Figure 2:
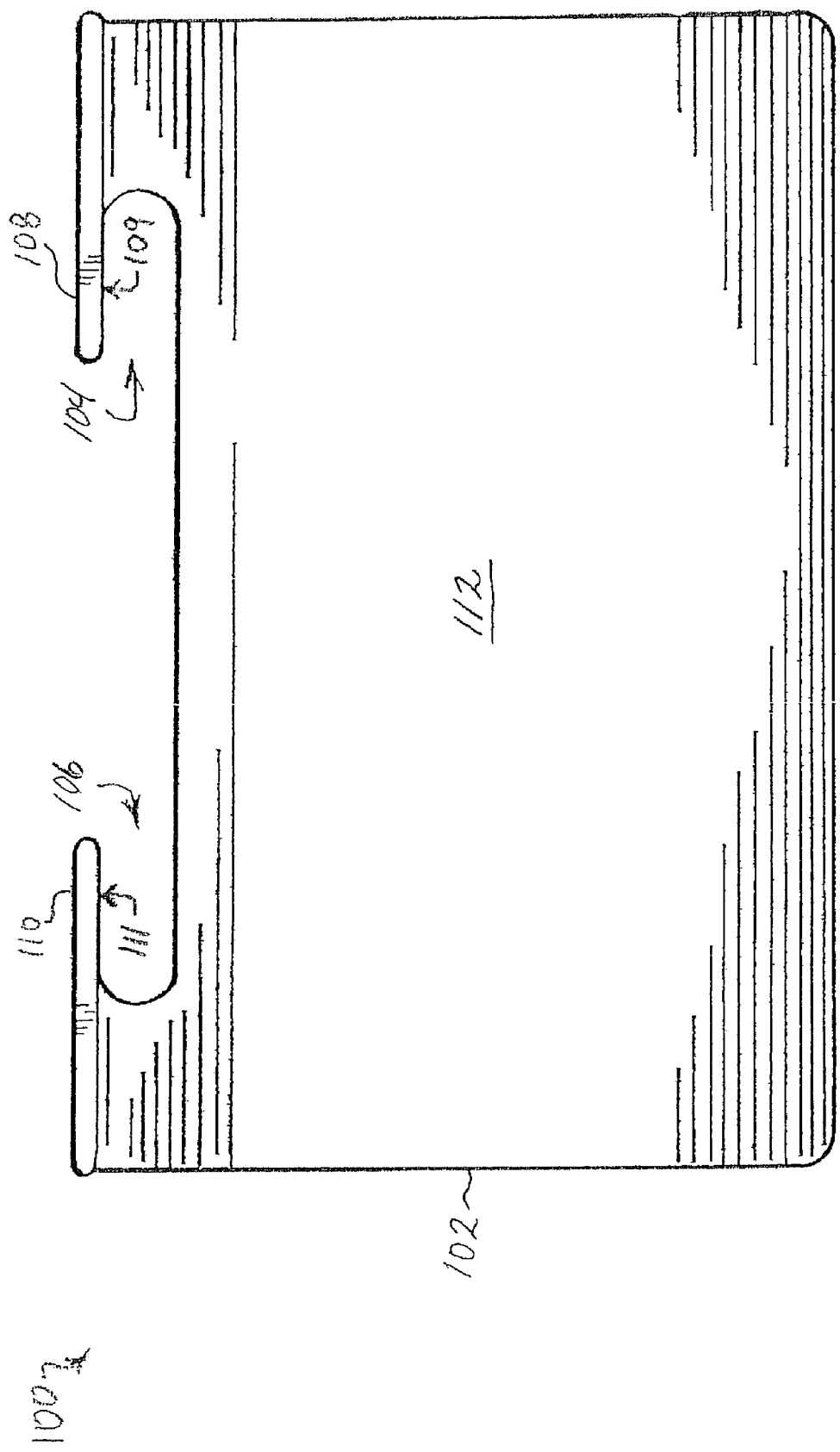
FIG. 2 is a top view of the tray assembly shown in FIG. 1.

Referring first to FIGS. 1 and 2, FIG. 1 shows a tray assembly 100 mounted onto a tripod 200 (shown in phantom) and FIG. 2 shows a plan view of the tray assembly 100. The tray assembly 100 includes a shelf 102 that mounts onto two of the tripod legs 210 at slots 104, 106. The shelf 102 is supported in a cantilever fashion by a pair of support tabs 108, 110. The support tabs 108, 110 have respective contact surfaces 109, 111, and at least a portion of each of the contact surfaces 109, 111 is intended to contact a respective tripod leg 210 when the tray assembly 100 is installed. The shelf 102 hangs off the tripod 200 away from the tripod 200, thus providing a level, accessible work and storage surface 112 for an artist or other tripod user. A user can remove the tray assembly 100 from the tripod 200 by simply lifting the tray assembly 100 up and away from the tripod 200. Note that in a preferred embodiment, the entire contact surfaces 109, 111 extend substantially perpendicular to the surface 112. Thus, slot 104 is bound by opposing non-coplanar surfaces since the storage surface 112 and support tab 108 extend along opposing edges of the slot 104. Similarly, the slot 106 is bound by opposing non-coplanar surfaces since the storage surface 112 and support tab 110 extend along opposing edges of the slot 106. In alternative embodiments the angle between the surface 112 and the contact surfaces 109, 111 can be any angle so as to more closely match the angle of the tripod legs 210 relative to the surface 112.

The tray assembly 100 is formed of rigid material, such as plastic, wood, or metal. In preferred embodiments, the tray assembly 100 is formed from a plastic sheet, for example an Acrylonitrile Butadiene Styrene (ABS) plastic sheet. In a preferred embodiment, the tray assembly 100 is formed from an ABS plastic sheet that has a thickness in a range of 0.1 inches to 0.5 inches, preferably approximately 0.25 inches thick. It will be appreciated that the type of material used and thickness of the material used can vary depending on the expected load to be supported by the shelf 102. Since the shelf 102 is supported in a cantilever fashion by the support tabs 108, 110, no additional support arms are needed.

It is to be understood that the term "tripod" as used herein encompasses any tripodic device, that is, one having three legs, for which a work/storage surface would be a useful addition. These devices may include but are not limited to artist easels, display easels, office easels, surveyor tripods, camera tripods, telescope tripods, or tripods for other optical or measuring devices.

In a preferred embodiment, the slots 104, 106 are wide enough to accommodate tripod legs that are approximately 0.75 inches in diameter. However, in alternative embodiments, the slots 104, 106 of the tray assembly 100 can be sized and shaped so as to accommodate alternative sizes and types of tripod units 200, including but not limited to square leg tripods, larger diameter tripod legs, longer spaces between tripod legs, and non-easel tripods, without departing from the spirit and scope of the present invention.

Figure 3:
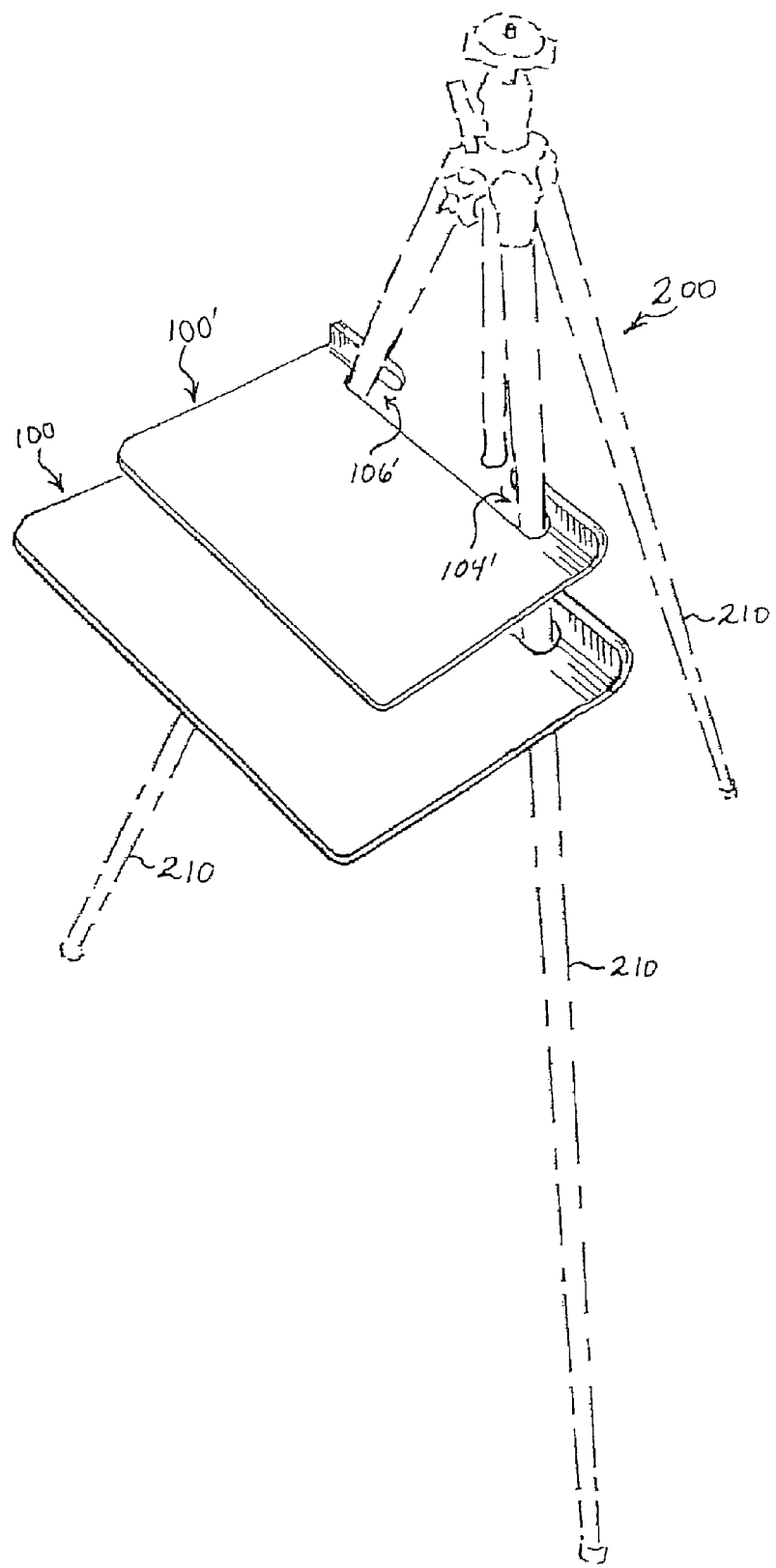
FIG. 3 shows a perspective view of a pair of tray assemblies having different sizes and installed together on a single tripod.

Referring next to FIG. 3, which shows a perspective view of a pair of tray assemblies 100 and 100'. The tray assembly 100' is similar to the tray assembly 100. A primary difference between the tray assembly 100 and the tray assembly 100' is that the tray assembly 100' is smaller than the tray assembly 100. Specifically the distance between the slots 104' and 106' of the tray assembly 100' is less than the distance between the slots 104 and 106 of the tray assembly 100. As a result, when the tray assembly 100' is installed onto the tripod 200, it rests higher on the tripod legs 210 than the tray assembly 100. Thus, the tray assemblies 100, 100' can be simultaneously installed onto a same pair of legs 210 of a tripod 200. It will be appreciated that additional tray assemblies 100 can be installed by providing tray assemblies of different sizes, specifically where the distances between the slots 104,106 are varied.

Figure 4:
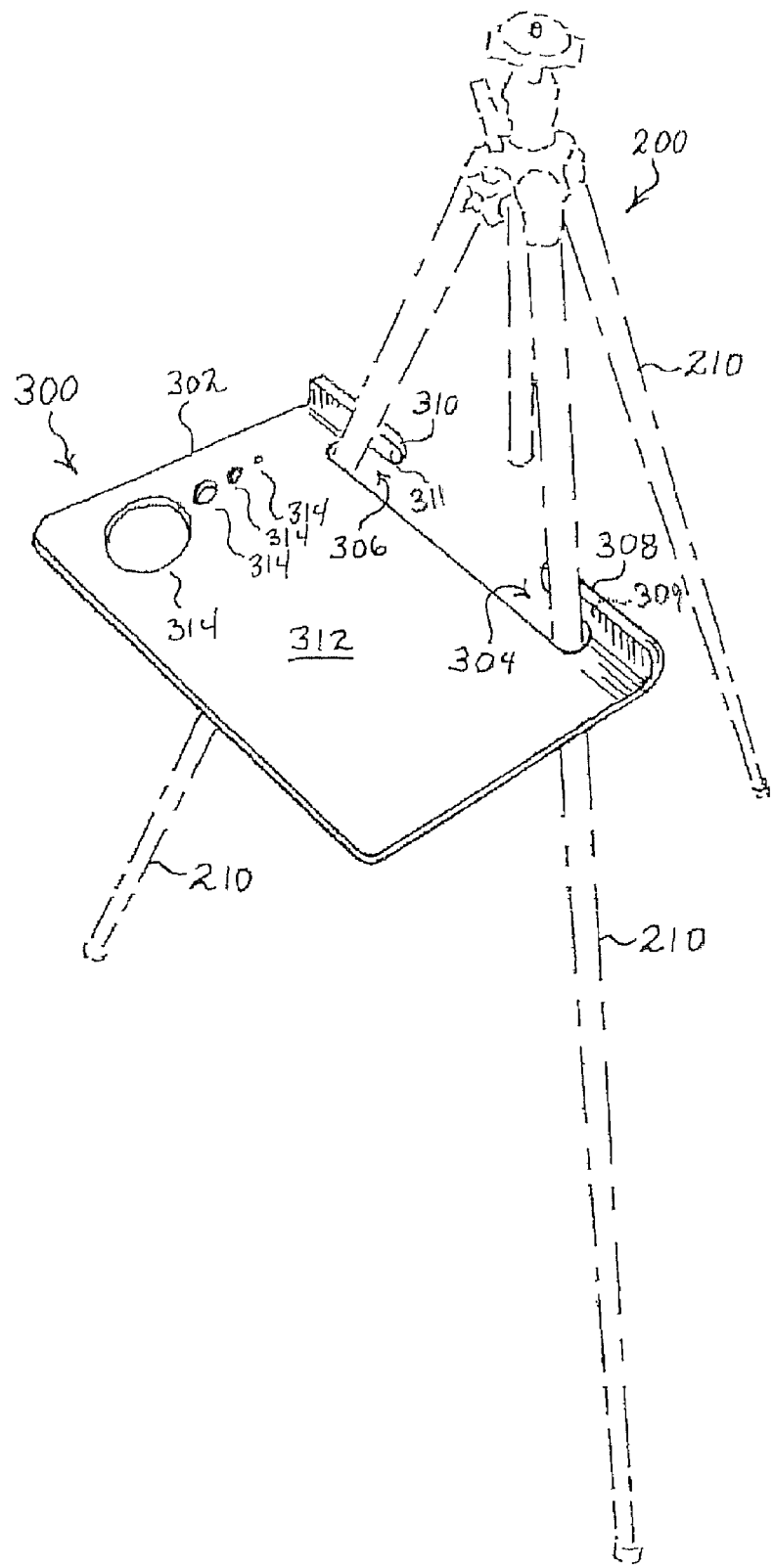
FIG. 4 shows a perspective view of an alternative tray assembly provided with a plurality of holes.

Referring next to FIG. 4, an alternative embodiment of the tray assembly 300 is shown. The tray assembly 300 is similar to the tray assembly 100. The tray assembly 300 includes a shelf 302 that mounts onto two of the tripod legs 210 at slots 304, 306. The shelf 302 is supported in a cantilever fashion by a pair of support tabs 308, 310. The support tabs 308, 310 have respective contact surfaces 309, 311, and at least a portion of each of the contact surfaces 309, 311 is intended to contact a respective tripod leg 210 when the tray assembly 300 is installed. The shelf 302 hangs off the tripod 200 away from the tripod 200, thus providing a level, accessible work and storage surface 312 for an artist or other tripod user. A user can remove the tray assembly 300 from the tripod 200 by simply lifting the tray assembly 300 up and away from the tripod 200. Note that in a preferred embodiment, the entire contact surfaces 309, 311 extend substantially perpendicular to the surface 312. However, in alternative embodiments the angle between the surface 312 and the contact surfaces 309, 311 can be greater than 90 degrees so as to more closely match the angle of the tripod legs 210 relative to the surface 312.

The tray assembly 300 also includes a plurality of holes 314. The holes 314 can vary in size as shown in FIG. 4. In some embodiments, such as embodiments where the tray assembly 300 is intended for use as an artist's tray, the size and shape of the holes 314 can be configured so as to be useful for holding various paint brushes, paint containers, water containers, or other art tools. In other embodiments, such as embodiments where the tray assembly 300 is intended for use as a photographer's tray, the size and shape of the holes 314 can be configured so as to be useful for holding various camera lenses, film containers, or other camera accessories. In still other embodiments, such as embodiments where the tray assembly 300 is intended for use with a telescope, the size and shape of the holes 314 can be configured so as to be useful for holding various telescope lenses, a compass, lens caps, or other telescope accessories. It should be appreciated that in still further embodiments, any number of holes 314 of various shapes and sizes can be provided for various uses. It should also be noted that one or more wells of various size, shape, and depth can be formed in place of, or in addition to, the holes 314.

Like the tray assembly 100, the tray assembly 300 is formed of rigid material, such as plastic, wood, or metal. In preferred embodiments, the tray assembly 300 is formed from a plastic sheet, for example an ABS plastic sheet. In a preferred embodiment, the tray assembly 300 is formed from an ABS plastic sheet that has a thickness in a range of 0.1 inches to 0.5 inches, preferably approximately 0.25 inches thick. It will be appreciated that the type of material used and thickness of the material used can vary depending on the expected load to be supported by the shelf 302. Since the shelf 302 is supported in a cantilever fashion by the support tabs 308, 310, no additional support arms are needed.

In a preferred embodiment, the slots 304, 306 are wide enough to accommodate tripod legs that are approximately 0.75 inches in diameter. However, in alternative embodiments, the slots 304, 306 of the tray assembly 300 can be sized and shaped so as to accommodate alternative sizes and types of tripod units 200, including but not limited to square leg tripods, larger diameter tripod legs, longer spaces between tripod legs, and non-easel tripods, without departing from the spirit and scope of the present invention.

Figure 5:
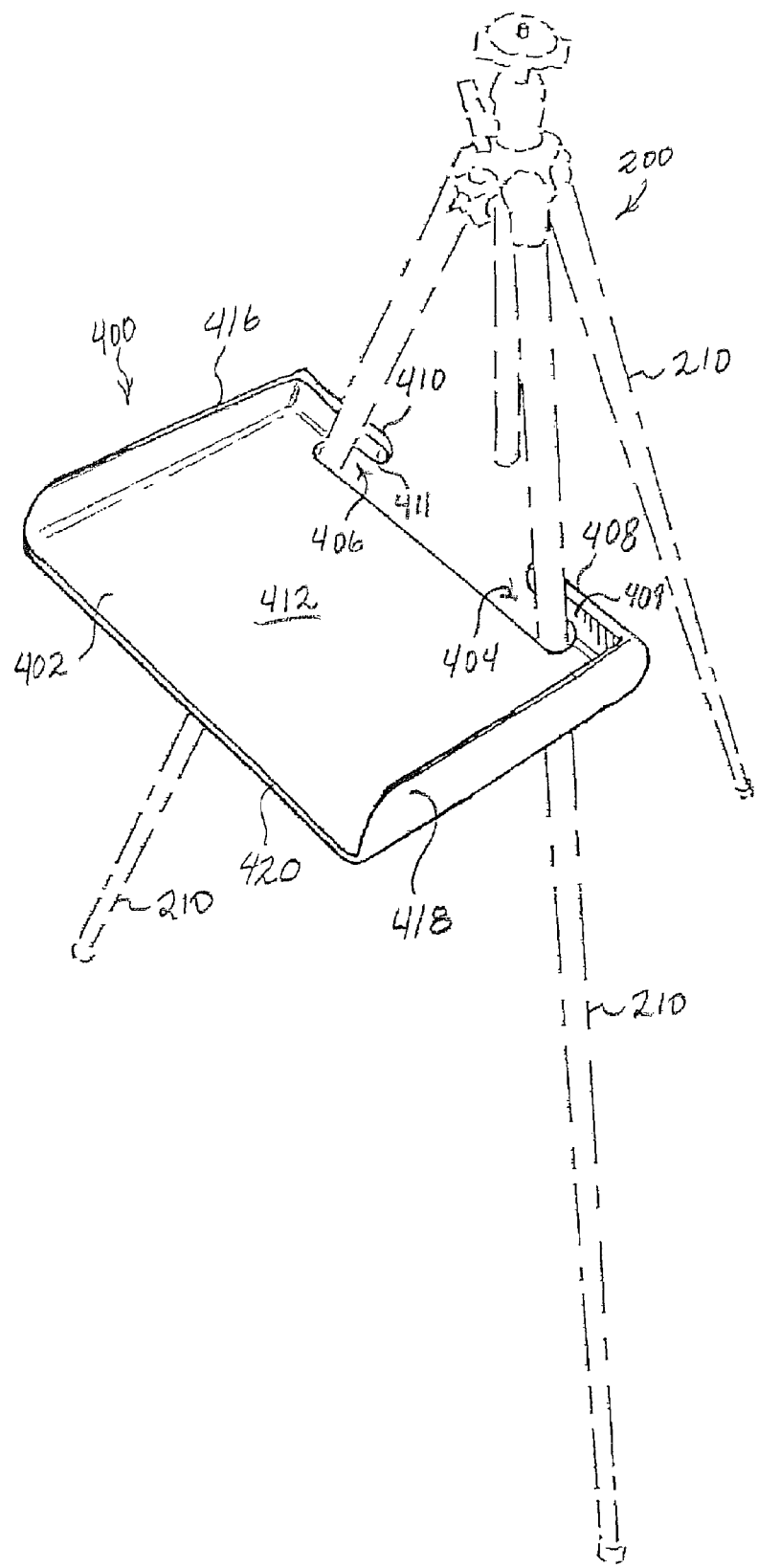
FIG. 5 shows a perspective view of an alternative tray assembly provided with side walls.

Referring next to FIG. 5, another alternative embodiment of the tray assembly 400 is shown. The tray assembly 400 is similar to the tray assembly 100. The tray assembly 400 includes a shelf 402 that mounts onto two of the tripod legs 210 at slots 404, 406. The shelf 402 is supported in a cantilever fashion by a pair of support tabs 408, 410. The support tabs 408, 410 have respective contact surfaces 409, 411, and at least a portion of each of the contact surfaces 409, 411 is intended to contact a respective tripod leg 210 when the tray assembly 400 is installed. The shelf 402 hangs off the tripod 200 away from the tripod 200, thus providing a level, accessible work and storage surface 412 for an artist or other tripod user. A user can remove the tray assembly 400 from the tripod 200 by simply lifting the tray assembly 400 up and away from the tripod 200. Note that in a preferred embodiment, the entire contact surfaces 409, 411 extend substantially perpendicular to the surface 412. However, in alternative embodiments the angle between the surface 412 and the contact surfaces 409, 411 can be greater than 90 degrees so as to more closely match the angle of the tripod legs 210 relative to the surface 412.

The tray assembly 400 also includes a pair of side walls 416 and 418 that extend along opposing edges of the surface 412. The side walls 416 and 418 can extend the full length of the edges of the surface 412 as shown in FIG. 5, or alternatively can extend along only a portion of the edges of the surface 412. It should be appreciated that an additional side wall can extend along the front edge 420 of the surface 412 in combination with, or instead of, the side walls 416 and 418. The side walls 416 and 418 help retain items on the surface 412, for example pencils or other items that are prone to rolling. The side walls 416 and 418 also provide added strength to the shelf 402 to assist in resistance of the shelf 402 to bowing or flexing. The side walls 416 and 418 can also be used to support a removable tray or liner (see, for example, FIGS. 17A-18B) that extends over all or part of the surface 412 and up and over at least a portion of the side walls 416, 418. For example, a disposable liner could be provided for covering the surface 412 so that the shelf 416 can be used as a paint palette without getting paint on the surface 412 of the shelf 416.

Like the tray assembly 100, the tray assembly 400 is formed of rigid material, such as plastic, wood, or metal. In preferred embodiments, the tray assembly 400 is formed from a plastic sheet, for example an ABS plastic sheet. In a preferred embodiment, the tray assembly 400 is formed from an ABS plastic sheet that has a thickness in a range of 0.1 inches to 0.5 inches, preferably approximately 0.25 inches thick. It will be appreciated that the type of material used and thickness of the material used can vary depending on the expected load to be supported by the shelf 402. Since the shelf 402 is supported in a cantilever fashion by the support tabs 408, 410, no additional support arms are needed.

In a preferred embodiment, the slots 404, 406 are wide enough to accommodate tripod legs that are approximately 0.75 inches in diameter. However, in alternative embodiments, the slots 404, 406 of the tray assembly 400 can be sized and shaped so as to accommodate alternative sizes and types of tripod units 200, including but not limited to square leg tripods, larger diameter tripod legs, longer spaces between tripod legs, and non-easel tripods, without departing from the spirit and scope of the present invention.

Figure 6:
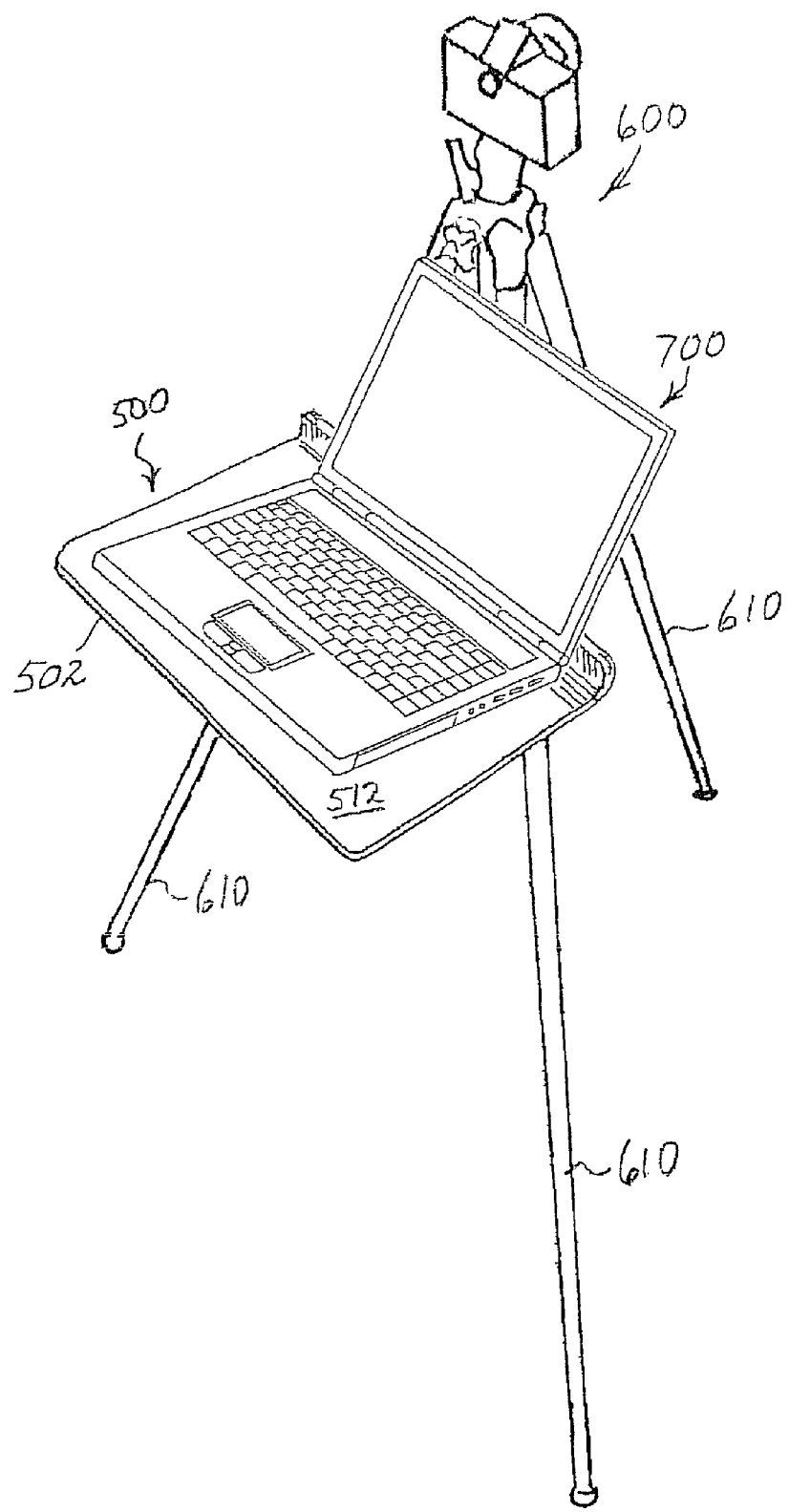
FIG. 6 shows a perspective view of a photography system including a removable tray assembly.

Referring next to FIG. 6, another alternative embodiment of the tray assembly 500 is shown. The tray assembly 500 is similar to the tray assembly 100. The tray assembly 500 is shown attached onto a camera tripod 600. A camera 602 is also mounted to the camera tripod 600. The tray assembly 500 includes a shelf 502 that mounts onto two of the tripod legs 610 at slots that are not shown in FIG. 6, but can appear the same as the slots 104, 106 in FIG. 1. The shelf 502 is supported in a cantilever fashion by a pair of support tabs (not shown in FIG. 6, but can appear the same as the support tabs 108, 110 shown in FIG. 1). The support tabs have respective contact surfaces, and at least a portion of each of the contact surfaces is intended to contact a respective tripod leg 610 when the tray assembly 500 is installed. The shelf 502 hangs off the tripod 600 away from the tripod 600, thus providing a level, accessible surface 512 for supporting a laptop computer 700. A user can remove the tray assembly 500 from the tripod 600 by simply lifting the tray assembly 500 up and away from the tripod 600. Note that in a preferred embodiment, the entire contact surfaces of the support tabs extend substantially perpendicular to the surface 512. However, in alternative embodiments the angle between the surface 512 and the contact surfaces can be greater than 90 degrees so as to more closely match the angle of the tripod legs 610 relative to the surface 512.

The tray assembly 500 can optionally include an auxiliary power supply for the laptop computer 700. The tray assembly 500 can also optionally include holes, such as holes 314 shown in FIG. 4, and/or wells (not shown) for storing camera and/or computer accessories. Like the tray assembly 100, the tray assembly 500 is formed of rigid material, such as plastic, wood, or metal. In preferred embodiments, the tray assembly 500 is formed from a plastic sheet, for example an ABS plastic sheet. In a preferred embodiment, the tray assembly 500 is formed from an ABS plastic sheet that has a thickness in a range of 0.1 inches to 0.5 inches, preferably approximately 0.25 inches thick. It will be appreciated that the type of material used and thickness of the material used can vary depending on the expected load to be supported by the shelf 502. Since the shelf 502 is supported in a cantilever fashion by the support tabs, no additional support arms are needed.

In a preferred embodiment, the slots of the tray assembly 500 are wide enough to accommodate tripod legs that are approximately 0.75 inches in diameter. However, in alternative embodiments, the slots of the tray assembly 500 can be sized and shaped so as to accommodate alternative sizes and types of tripod units 600, including but not limited to square leg tripods, larger diameter tripod legs, longer spaces between tripod legs, and non-easel tripods, without departing from the spirit and scope of the present invention.

Still further embodiments will be described in connection with FIGS. 7-20B. While the tripod is not shown in FIGS. 7-20B, it should be appreciated that the embodiments shown in FIGS. 7-20B can be removably attached to a tripod as described above in connection with FIGS. 1-6.

Figure 7:
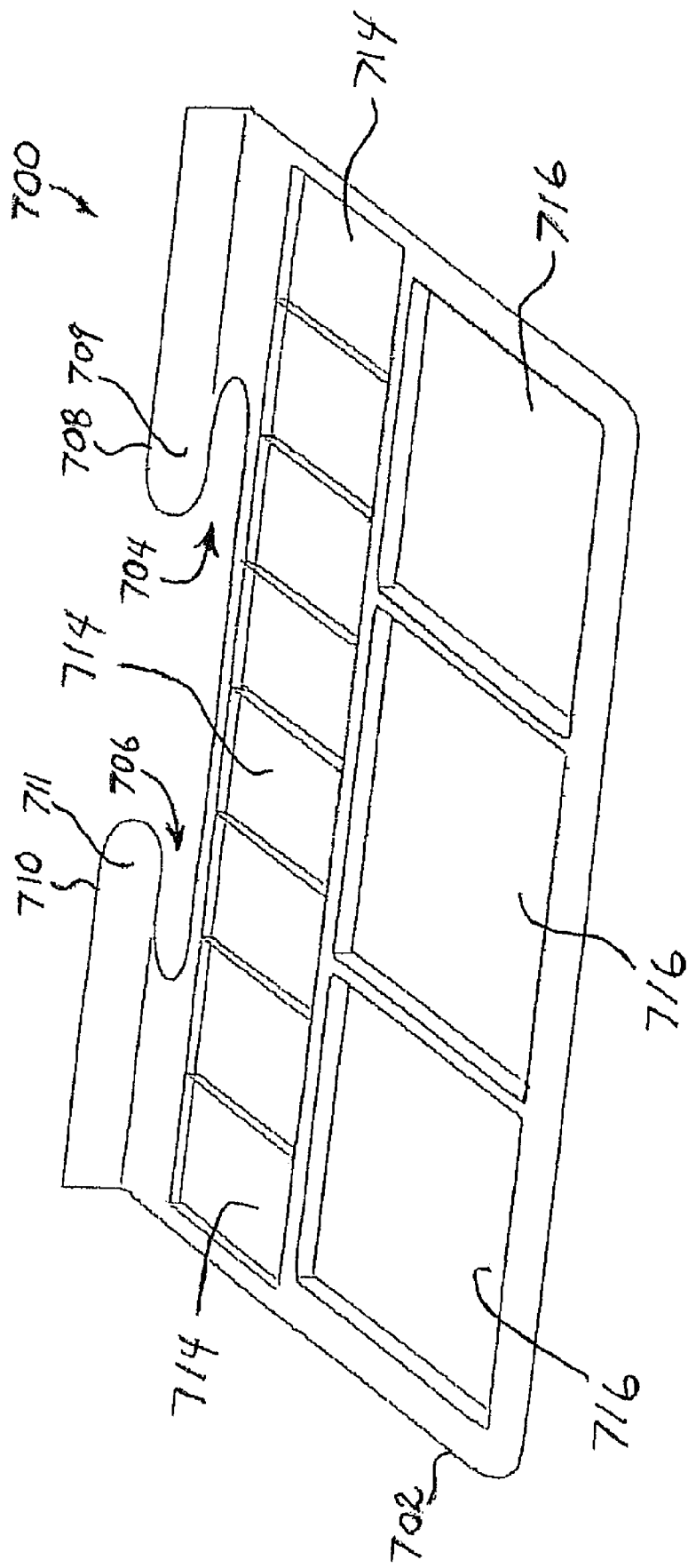
FIG. 7 shows a perspective view of an alternative tray assembly comprising a plurality of wells.

Turning next to FIG. 7, an alternative embodiment of the tray assembly 700 is shown which is particularly useful as a palette. The tray assembly 700 is similar to the tray assembly 100 such that the description of tray assembly 100 applies equally to tray assembly 700 except for differences that are described below. Like the tray assembly 100, the tray assembly 700 includes a shelf 702 that can be mounted onto two legs of a tripod (not shown in FIG. 7). Just as with above-described embodiments, the shelf 702 can be supported in a cantilever fashion by a pair of support tabs 708, 710. The support tabs 708, 710 have respective contact surfaces 709, 711, and at least a portion of each of the contact surfaces 709, 711 is intended to contact a respective tripod leg when the tray assembly 700 is installed on a tripod. The shelf 702 can hang off of a tripod in the same way as the embodiments described above in order to provide for a level, accessible palette 712 for an artist or other tripod user. It should be appreciated that, while the tray assembly 700 is particularly useful as a palette, the tray assembly 700 can actually be used for other purposes. For example, the tray assembly 700 can be useful for beadwork, jewelry-making, model-building, or needlecraft. As with the above-described embodiments, a user can remove the tray assembly 700 from the legs of a tripod by simply lifting the tray assembly 700 up and away from the tripod legs.

The tray assembly 700 also includes a plurality of small wells 714 and a plurality of large wells 716. The properties of the wells 714 and 716, such as the arrangement, shape, number, size, and depth of the wells 714 and 716, are shown in FIG. 7 merely as an example and can vary. The embodiment shown in FIG. 7 is particularly useful for painting, where small wells 714 can be used for different colors of paint, while large wells 716 can be used for mixing colors, can be used as a sponge well, or can be used for holding a container that stores other art supplies, such as brushes or rags. It should be appreciated, however, that these are merely examples of uses for the wells 714 and 716.

In some embodiments, the wells 714 and 716 can be formed directly into the shelf 702. For example, in embodiments where the shelf 702 is formed of plastic, the wells 714 and 716 can be formed using known vacuum or injection molding techniques. In embodiments where the shelf 702 is formed of metal, the wells 714 and 716 can be formed by known molding or stamping techniques. These are but a few examples of the numerous methods that can be employed for manufacturing tray assembly 700.

Figure 8:
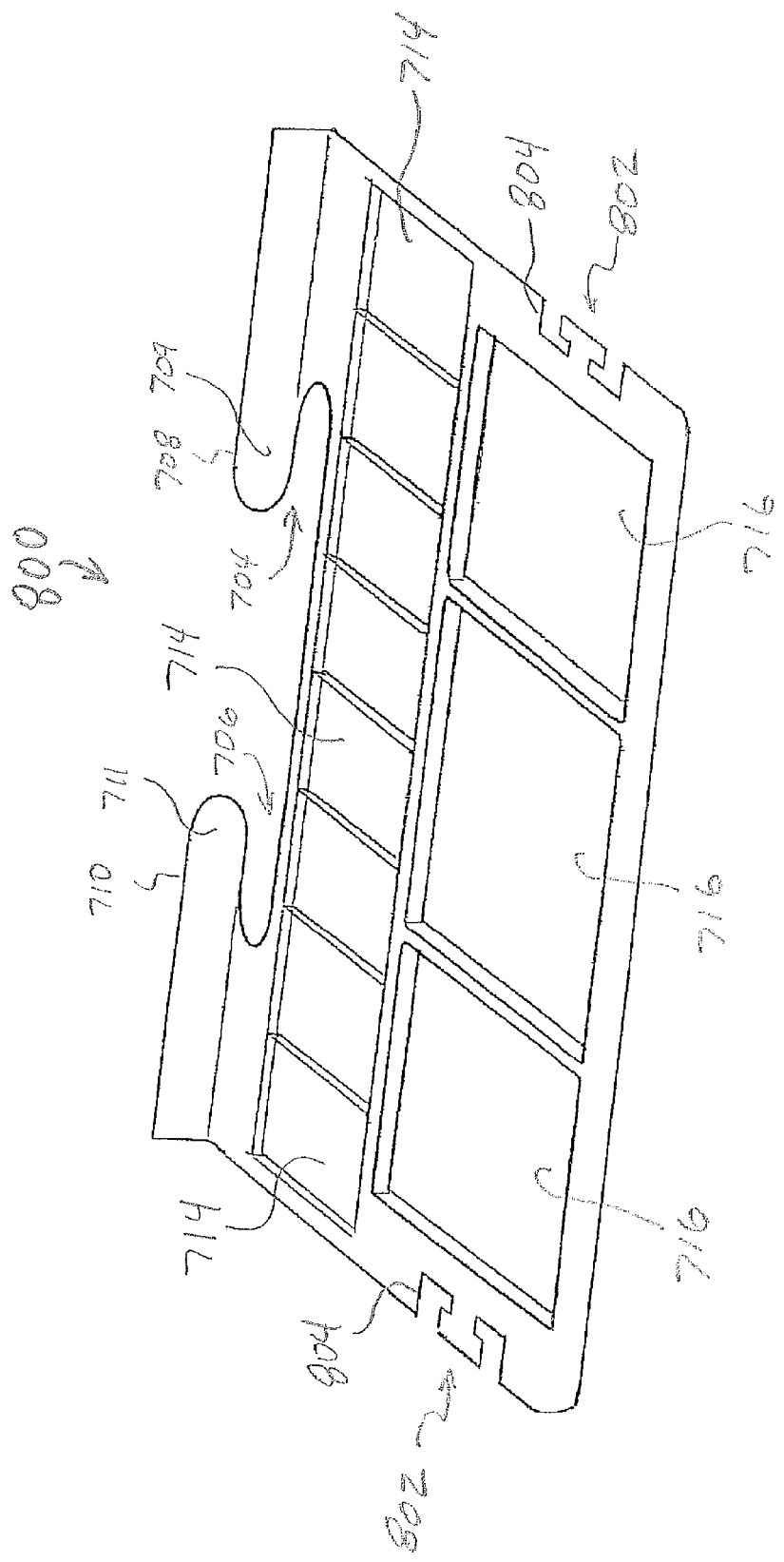
FIG. 8 shows a perspective view of an alternative tray assembly comprising a plurality of wells and hooks.

Turning next to FIG. 8, a perspective view of a tray assembly 800 is shown. Tray assembly 800 is similar to tray 700, except that tray assembly 800 includes one or more projections 802. The projections 802 are useful as hooks for supporting hanging articles, such as towels, tools, cans, or buckets, which can be hung from a projection 802 by a handle, string, or cord. The projections 802 extend within notches 804 formed in opposing side edges of the shelf 802. The projections 802 do not extend beyond the side edges of the shelf 802. In alternative embodiments, one or more of the projections 802 can extend beyond the side edges of the shelf 802. However, if a projection 802 extends beyond the side edge of the shelf 802, it may be more prone to being damaged or causing damage to something else. The projections 802 can be T-shaped projections as shown in FIG. 8. Alternatively, the projections 802 can have other shapes, for example projections 802 can be I-shaped, J-shaped, or L-shaped projections.

Other components of the tray assembly 800 are substantially identical to components of the tray assembly 700, and therefore have retained the same reference numbers.

Figure 9:
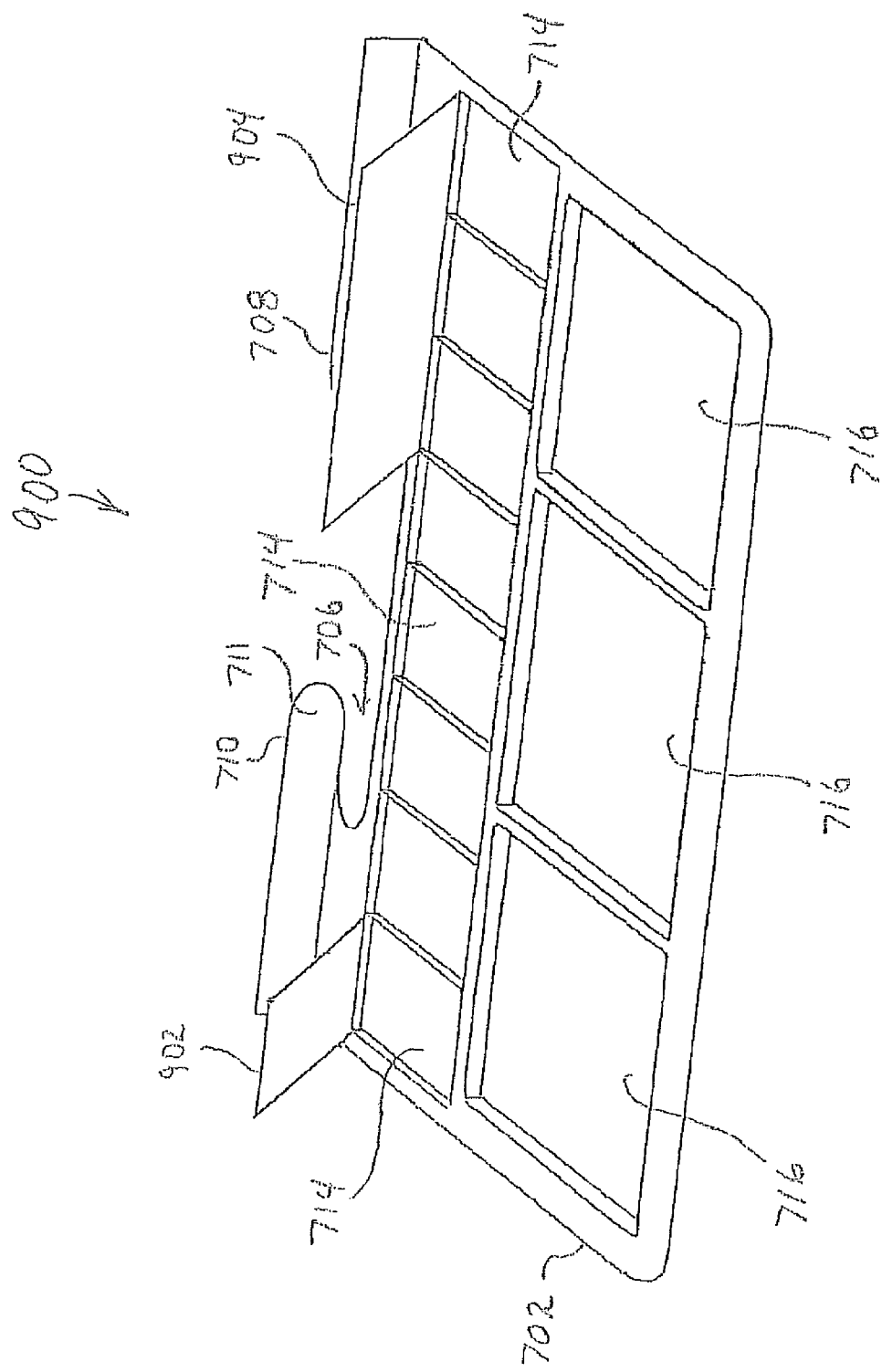
FIG. 9 shows a perspective view of an alternative tray assembly comprising a plurality of wells and well covers.

Turning next to FIG. 9, a perspective view of a tray assembly 900 is shown. Tray assembly 900 is similar to tray 700, except that tray assembly 900 includes one or more single-well covers 902 and one or more multiple-well covers 904. The covers 902 and 904 can be hingedly attached to the shelf 702 as shown in FIG. 9. Alternatively, the covers 902 and 904 can be removable covers that rest or snap into place to cover respective wells 714. Alternative embodiments can include covers 902 and/or 904 for any of the wells 714 and 716. Alternative embodiments of the multiple-well covers 904 can be configured for covering any number of wells 714 and/or 716. In some embodiments, the covers 902 and/or 904 can be rigid, for example formed of plastic, wood, or metal. In some embodiments, the covers 902 and/or 904 can be configured to be at least substantially flush with the upper surface of the shelf 702 when in place covering a respective well or wells 714 and/or 716. In some embodiments one or more covers 902 and/or 904 can include some grasping means for allowing easier grasping of the cover 902/904 in order to make it easier to lift from its respective well or wells 714 and/or 716. For example, the covers 902 and/or 904 can include a handle, notch, or raised region as a grasping means.

Turning next to FIGS. 10A-10C, a collapsible tray assembly 1000 is shown. It will be appreciated that other tray assembly embodiments disclosed herein can be modified to be collapsible like tray assembly 1000, including embodiments comprising one or more wells and/or holes. The tray assembly 1000 can be substantially the same as tray assembly 100, except that the tray assembly 1000 includes a shelf 1002 having a hinge 1004 that allows the tray assembly 1000 to be folded from the deployed configuration shown in FIG. 10A to the stowed configuration shown in FIGS. 10B and 10C. The shelf 1002 is split at break 1006, which extends through the shelf 1002 and divides the shelf 1002 into a first shelf portion 1002a and a second shelf portion 1002b. The hinge 1004 connects the first and second shelf portions 1002a and 1002b and allows the shelf portions 1002a and 1002b to be folded towards each other as shown in FIGS. 10B and 10C, and unfolded in the opposite direction.

Figure 11A:
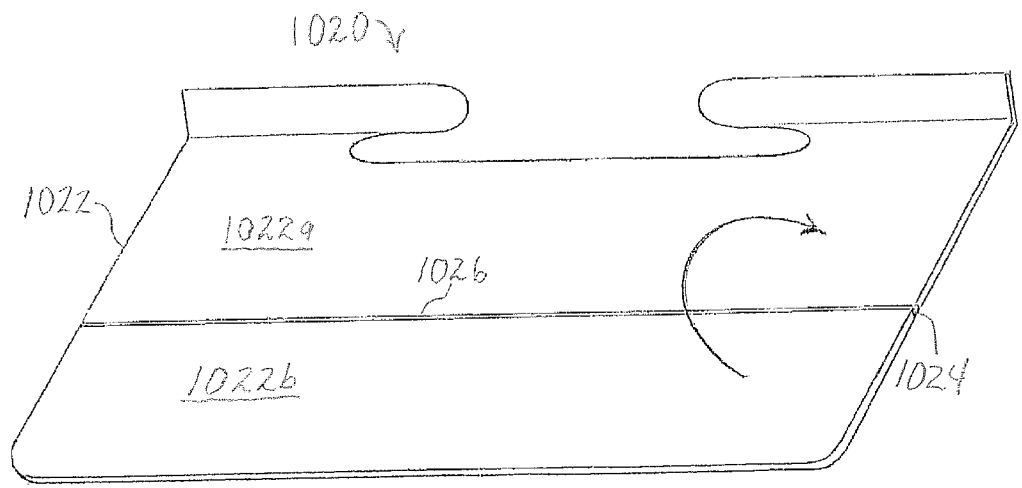
FIGS. 11A-11B show an alternative collapsible tray assembly.
Figure 11B:
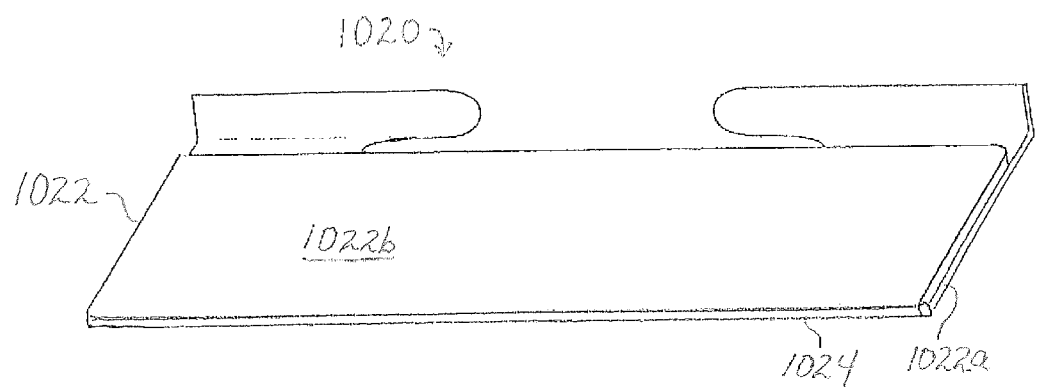

Turning next to FIGS. 11A and 11B, a collapsible tray assembly 1020 is shown. It will be appreciated that other tray assembly embodiments disclosed herein can be modified to be collapsible like tray assembly 1020, including embodiments including one or more wells and/or holes. The tray assembly 1020 can be substantially the same as tray assembly 1000, except that the tray assembly 1000 includes a shelf 1002 having a hinge 1004 that extends from the front to the back of the shelf 1002, while the tray assembly 1020 includes a shelf 1022 having a hinge 1024 that extends between opposing sides of the shelf 1022. The hinge 1024 allows the tray assembly 1020 to be folded from the deployed configuration shown in FIG. 11A to the stowed configuration shown in FIG. 11B. The shelf 1022 is split at break 1026, which extends through the shelf 1022 and divides the shelf 1022 into a first shelf portion 1022a and a second shelf portion 1022b. The hinge 1024 connects the first and second shelf portions 1022a and 1022b and allows the first and second shelf portions 1022a and 1022b to be folded towards each other as shown in FIG. 11B, and unfolded in the opposite direction.

Turning next to FIGS. 12A and 12B, a perspective view of a tray assembly 1100 is shown. Tray assembly 1100 is similar to tray assembly 700, except that tray assembly 1100 includes a removable container 1118. More specifically, the tray assembly 1100 includes a shelf 1102, and the container 1118 is removable from the shelf 1102. In this embodiment, a portion of the shelf 1102 defines a slot 1120. The container 1118 can be slid into the slot 1120 for installation, and slid out of the slot 1120 for removal. The container 1118 has a shoulder 1122 that supports the container 1118 while the container 1118 is positioned in the slot 1120. Other components of the tray assembly 1100 can be substantially identical to components of the tray assembly 700, and therefore have retained the same reference numbers.

Turning next to FIGS. 13A and 13B, a perspective view of a tray assembly 1200 is shown, which provides another example of how the removable container 1118 can be removably supported. Tray assembly 1200 is similar to tray assembly 700 and tray assembly 1100, except that tray assembly 1200 allows for a drop-in removable container 1118. More specifically, the tray assembly 1200 includes a shelf 1202 that defines a container hole 1220. The container 1118 is removable from the container hole 1220 in the shelf 1202. The container 1118 can be lowered into container hole 1220 for installation, and lifted back out of the container hole 1220 for removal. The shoulder 1122 supports the container 1118 while the container 1118 is positioned in the container hole 1220. Other components of the tray assembly 1200 can be substantially identical to components of the tray assembly 700, and therefore have retained the same reference numbers.

Figure 14A:
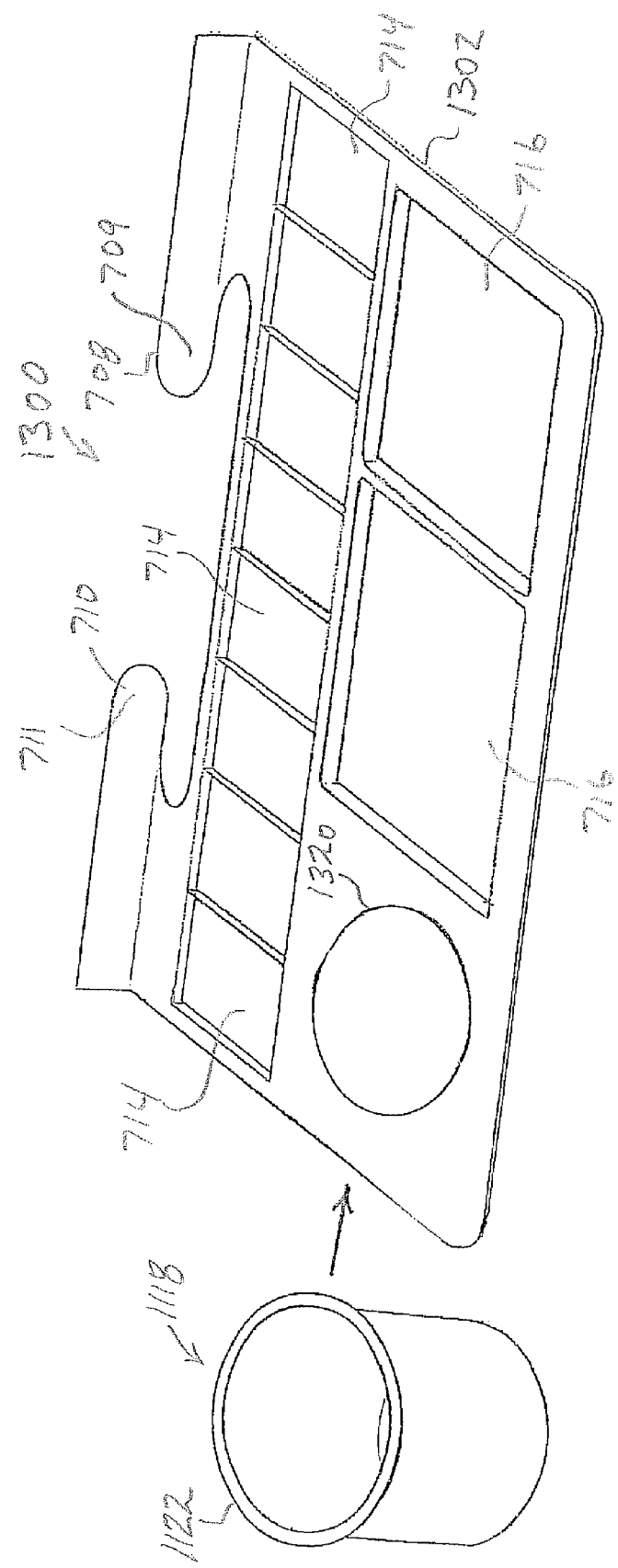
Figure 14C:
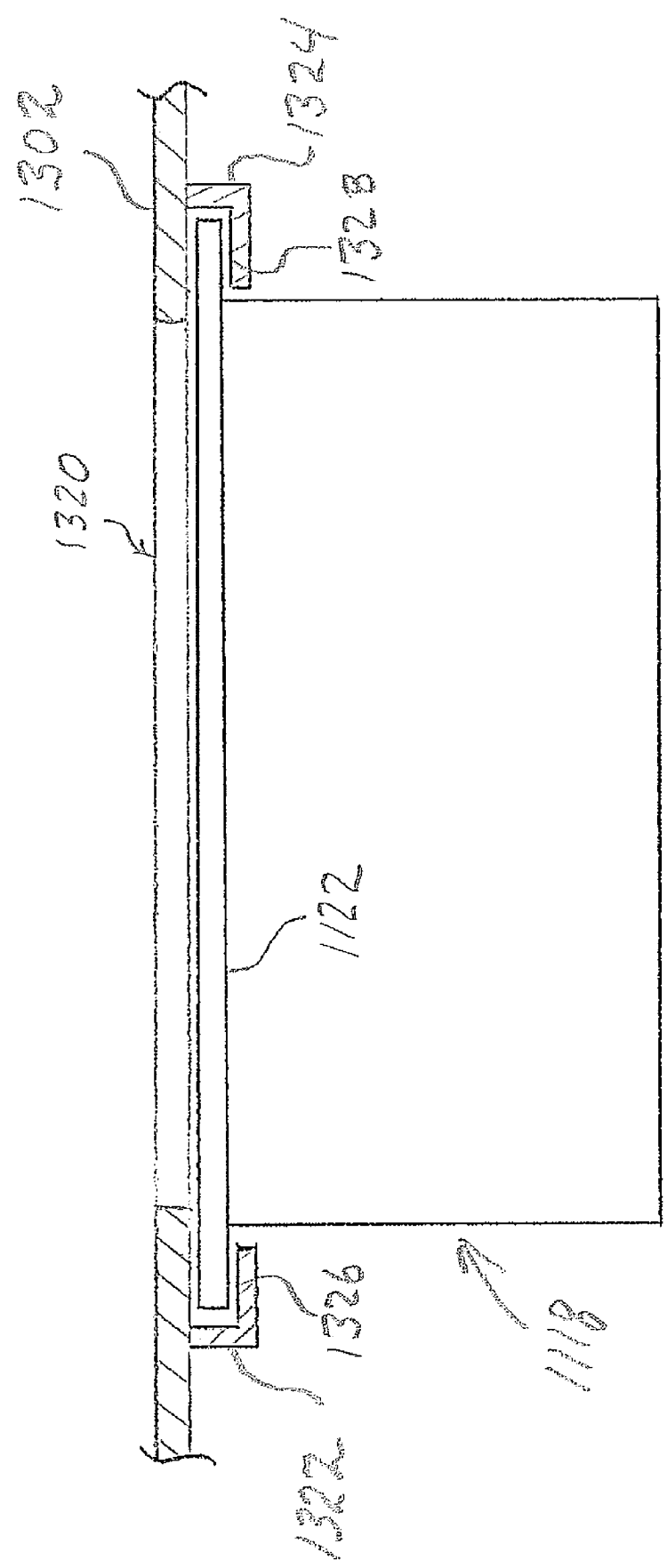

Turning next to FIGS. 14A-14C, a perspective view of a tray assembly 1300 is shown in FIGS. 14A and 14B, and FIG. 14C shows a cross-sectional view taken along section lines 14C-14C shown in FIG. 14B. This embodiment provides another example of how the removable container 1118 can be removably supported. Tray assembly 1300 is similar to tray assemblies 700, 1100, and 1200, except that tray assembly 1300 allows for a slide-in removable container 1118 that is supported underneath the tray assembly 1300. More specifically, the tray assembly 1300 includes a shelf 1302 that defines a container hole 1320. An opposing pair of L-shaped cup supports 1322 and 1324 are attached to the bottom side of the shelf 1302 on opposing sides of the container hole 1320 as best shown in FIG. 14C. As a result, slots 1326 and 1328 are defined between the bottom of the shelf 1302 and respective cup supports 1322 and 1324. In the embodiment shown, the slots 1326 and 1328 open to the side of the shelf 1302 so that the shoulder 1122 of the container 1118 can be slid into slots 1326 and 1328 for installation, and slid out of the slots 1326 and 1328 for removal. In other embodiments, the slots 1326 and 1328 can open to the front, back, or in any other desired direction. The shoulder 1122 supports the container 1118 on the cup supports 1322 and 1324 while the container 1118 is positioned below container hole 1220. The cup supports 1322 and 1324 can be integrally formed with the shelf 1302 or can be separately-formed elements that are attached to the shelf 1302. Other components of the tray assembly 1300 can be substantially identical to components of the tray assembly 700, and therefore have retained the same reference numbers.

In some embodiments, the container 1118 can be a rigid cup, bucket, or the like. In some embodiments, the container 1118 can be collapsible.

Figure 15A:
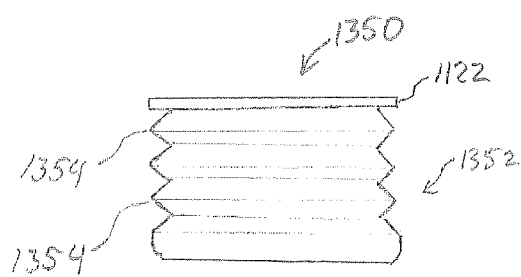
FIGS. 15A-15B show an embodiment of a collapsible cup for use with any of the tray assemblies shown in FIGS. 12A-14C.
Figure 15B:
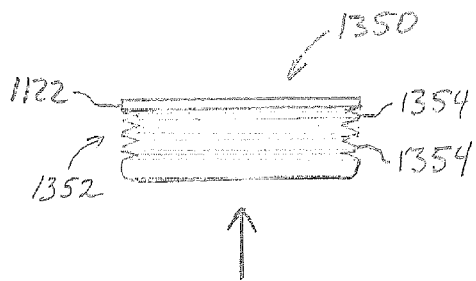

For example, FIGS. 15A and 15B show an accordion-style collapsible container 1350, which serves as an embodiment of a collapsible container 1118 that can be used with any of the tray assemblies 1100, 1200, and 1300. The container 1350 can be made of plastic and include a number of ridges 1354 formed in the side wall 1352 of the container 1350 such that the container 1350 can be collapsed from the extended configuration shown in FIG. 15A to the collapsed configuration shown in FIG. 15B, and then extended back to the extended configuration again as desired. The shoulder 1122 should remain rigid so as to be suitable for supporting the container 1350 as described above in connection with container 1118.

Figure 16A:
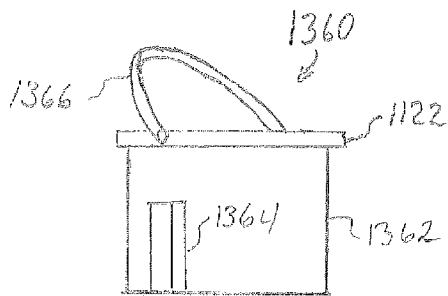
FIGS. 16A-16B show an embodiment of an alternative collapsible cup for use with any of the tray assemblies shown in FIGS. 12A-14C.
Figure 16B:
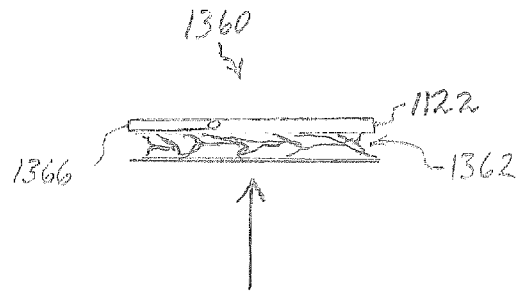

FIGS. 16A and 16B show another embodiment of a collapsible container 1118, this embodiment being generally designated as collapsible container 1360. The container 1360 includes side wall 1362 that extends around the container 1360. The side wall 1362 be made of plastic that is flexible enough to allow the side wall 1362 to be collapsed from the extended configuration shown in FIG. 16A to the collapsed configuration shown in FIG. 16B. The shoulder 1122 should remain rigid so as to be suitable for supporting the container 1350 as described above in connection with container 1118. In some embodiments, the container 1360 can include one or more pouches 1364 on the outside of the side wall 1362. For example, one or more pouches 1364 can be provided for storing pencils, paint brushes, or other objects. In some embodiments, the container 1360 can include a handle 1366. The handle 1366 is attached to the shoulder 1122 and is suitable for supporting the container 1360, for example for allowing a person to carry the container 1360 or hang the container 1360 from a hook or the like, for example such as projection 802 in FIG. 8. As shown in FIG. 16B, the handle 1366 can be aligned with the shoulder 1122 for storage or for when the container 1360 is installed in one of the tray assemblies 1100, 1200, or 1300.

Figure 17A:
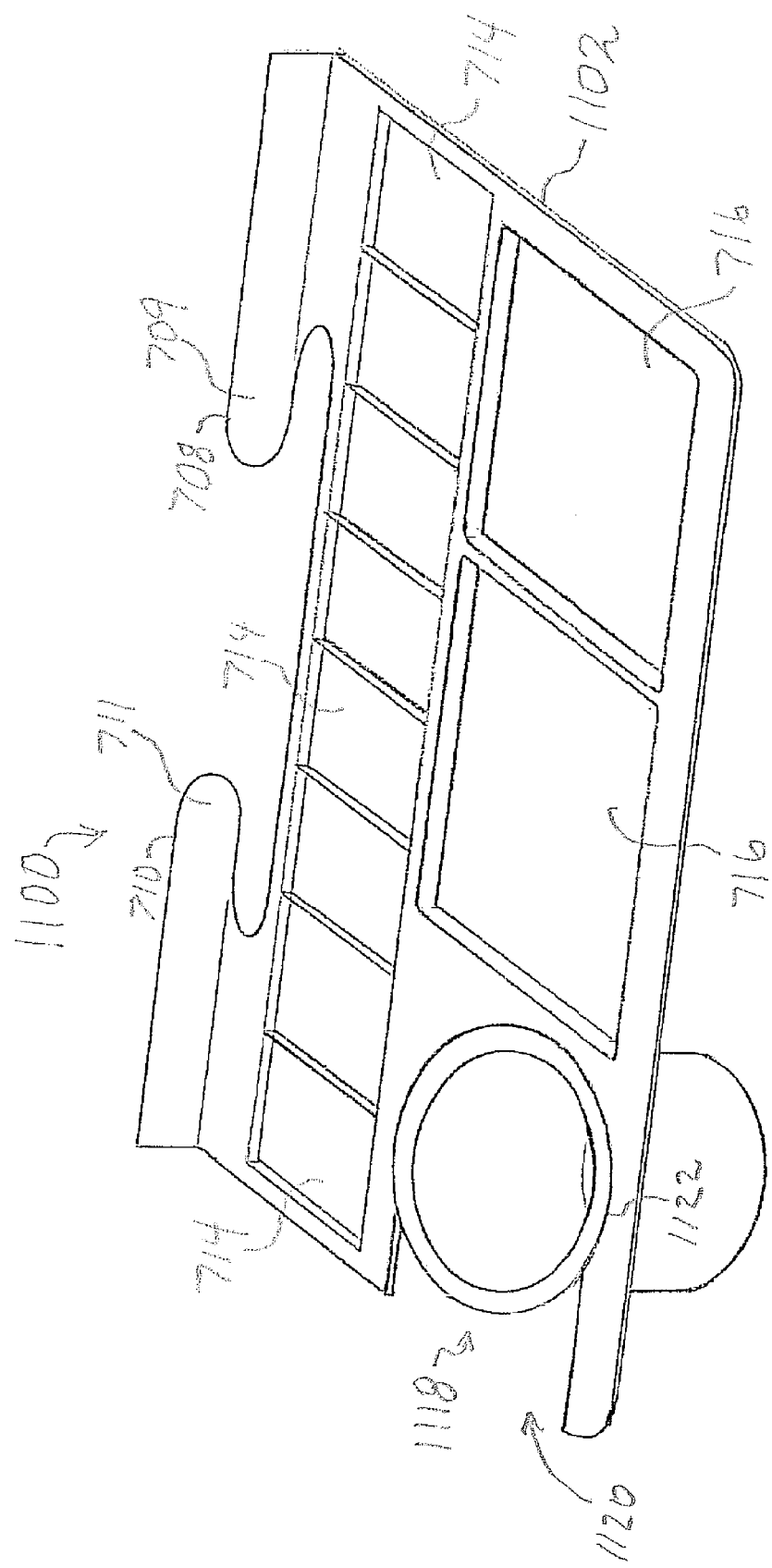
FIGS. 17A-17B show perspective views of an alternative tray assembly comprising a base portion and a slidably removable container.
Figure 13:
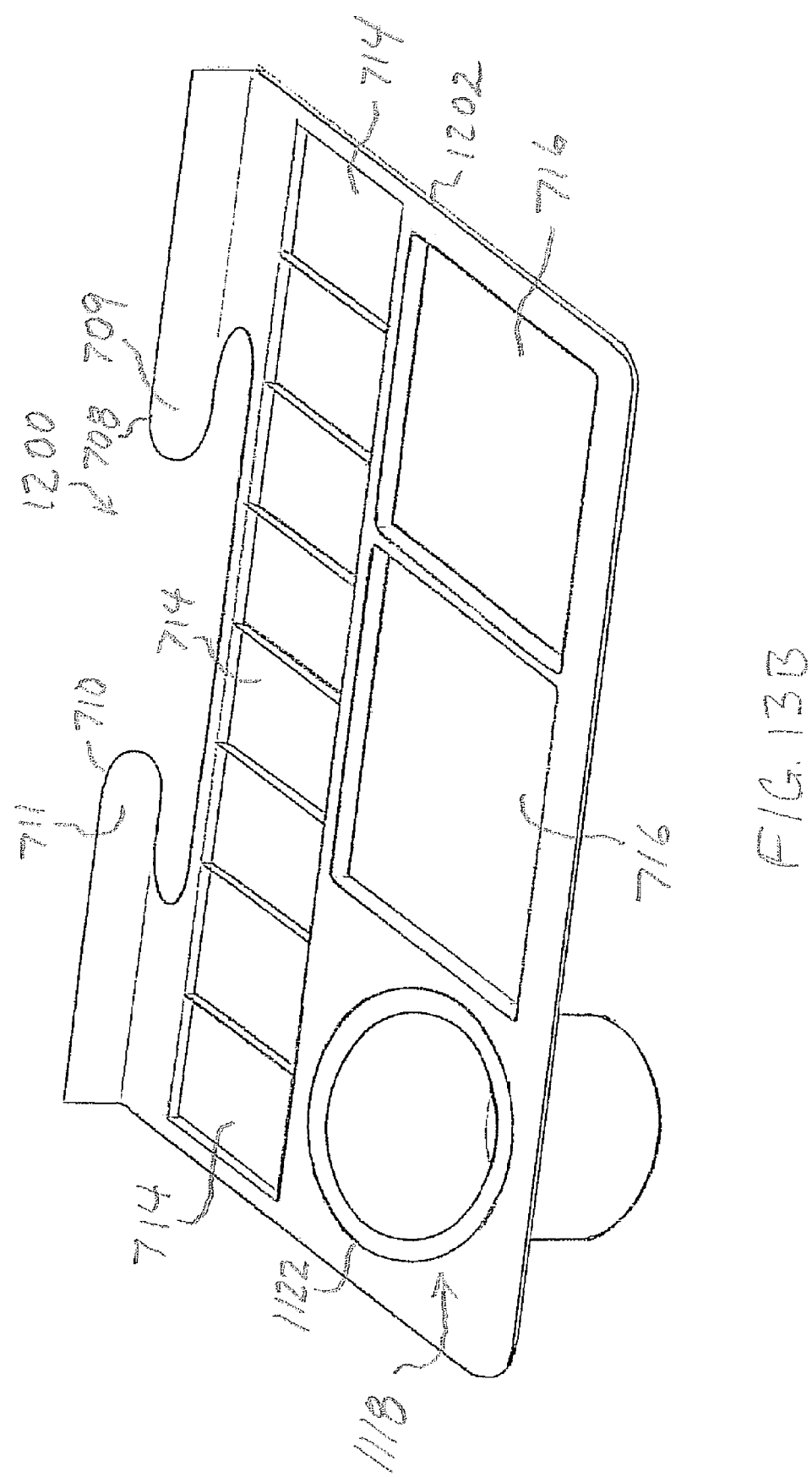
FIGS. 13A-13B show perspective views of an alternative tray assembly comprising a plurality of wells and a removable cup.
Figure 17A:
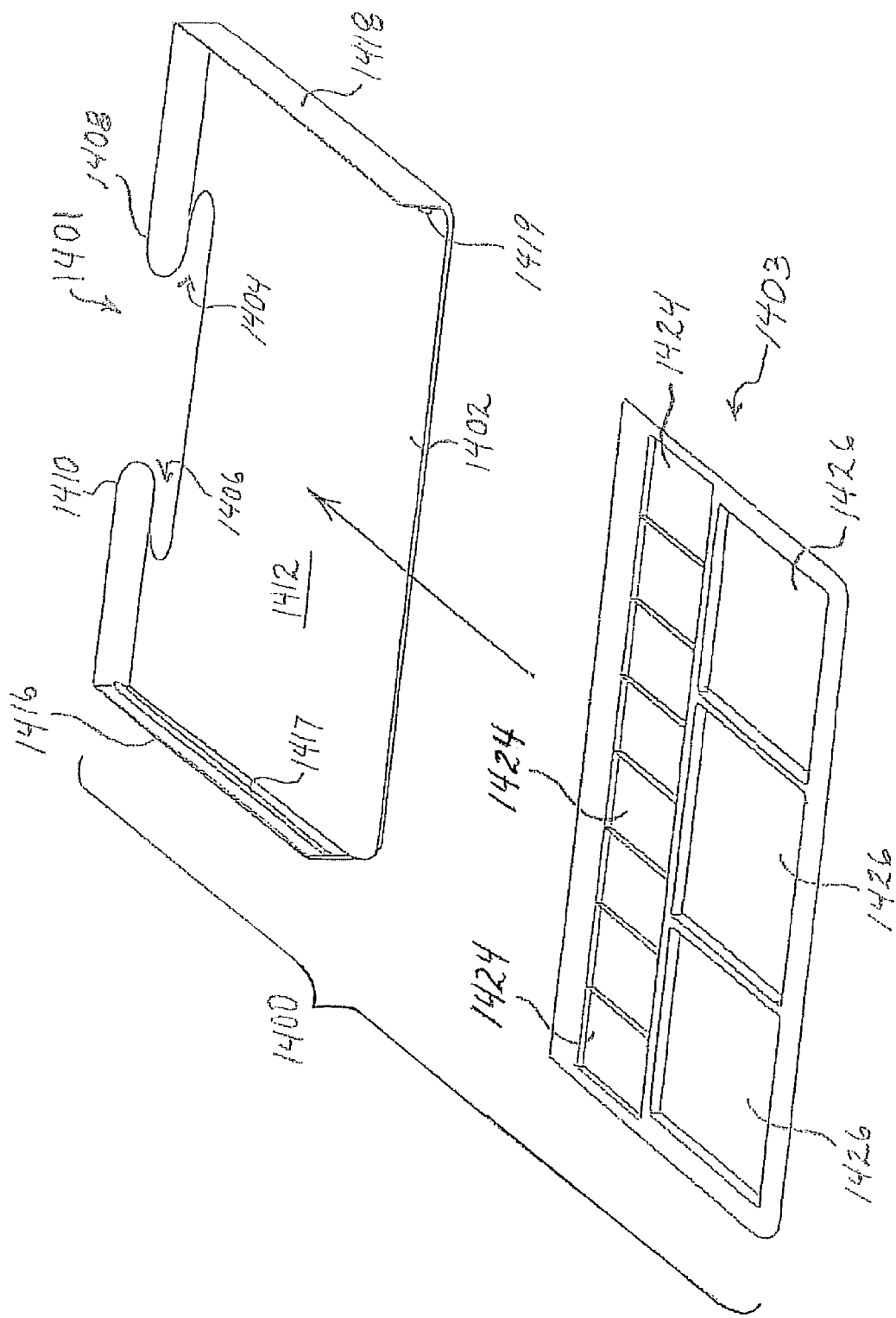
Figure 17B:
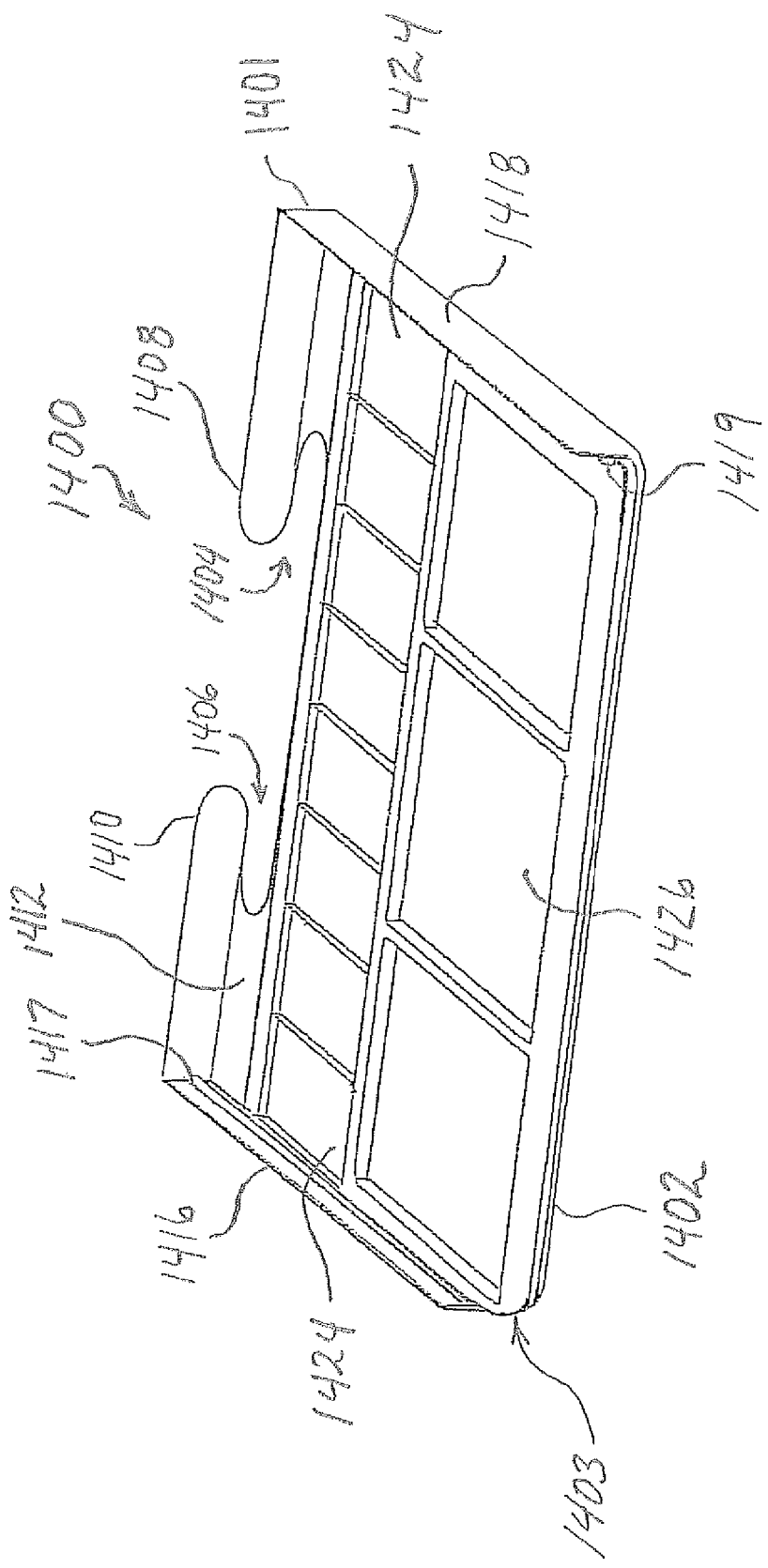

Turning next to FIGS. 17A and 17B, another alternative embodiment is shown and generally designated as tray assembly 1400. The tray assembly 1400 includes a base portion 1401 and a sliding removable container 1403.

The base portion 1401 can be similar to the tray assembly 400 (FIG. 5) such that the description of tray assembly 400 applies equally to the base portion 1401 of tray assembly 1400, except for differences that are described below. For example, the base portion 1401 includes a shelf 1402 configured to be mounted onto tripod legs at slots 1404 and 1406 and supported in a cantilever fashion by a pair of support tabs 1408 and 1410 in a manner as described above in connection with tray assembly 400. The base portion 1401 also includes a pair of side walls 1416 and 1418 that extend along opposing edges of an upper surface 1412 of the shelf 1402. The side walls 1416 and 1418 can extend the full length of the edges of the surface 1412 as shown in FIGS. 17A and 17B, or alternatively can extend along only a portion of the edges of the surface 1412. The side walls 1416 and 1418 include respective ridges 1417 and 1419. The ridges 1417 and 1419 protrude from respective walls 1416 and 1418 towards the shelf 1402. The ridges 1417 and 1419 can span the entire length of respective side walls 1416 and 1418 as shown, or can span only a portion of the length of the side walls 1416 and 1418. The ridges 1417 and 1419 protrude far enough from the respective side walls 1416 and 1419 so as to be useful for retaining removable container 1403. In some embodiments, the ridges 1417 and 1419 can include a series of spaced protrusions rather than a continuous protrusion as shown.

The removable container 1403 can be a shallow, rigid container suitable for carrying or holding things. The container 1403 can include a plurality of small wells 1424 and a plurality of large wells 1426. The properties of the wells 1424 and 1426, such as the arrangement, shape, number, size, and depth of the wells 1424 and 1426, are shown in FIGS. 17A and 17B merely as an example, and can vary. Also, in some embodiments, one or more of the wells 1424, 1426 can include covers, such as removable or hinged covers as described above in connection with tray assembly 900. The embodiment shown in FIGS. 17A and 17B is particularly useful for painting, where small wells 1424 can be used for different colors of paint, while large wells 1426 can be used for mixing colors, can be used as a sponge well, or can be used for holding a container that stores other art supplies, such as brushes or rags. It should be appreciated, however, that these are merely examples of uses for the wells 1424 and 1426.

In some embodiments, the wells 1424 and 1426 can be formed directly into the removable container 1403. For example, in embodiments where the removable container 1403 is formed of plastic, the wells 1424 and 1426 can be formed using known vacuum or injection molding techniques. In embodiments where the removable container 1403 is formed of metal, the wells 1424 and 1426 can be formed by known molding or stamping techniques. These are but a few examples of the numerous methods that can be employed for manufacturing the removable container 1403.

The removable container 1403 can have a height that corresponds to the distance between the ridges 1417, 1419 and the upper surface 1412 of the shelf 1402. This allows the removable container 1403 to fit between the ridges 1417, 1419 and the upper surface 1412 of the shelf 1402 as shown in FIG. 17B. Thus, the removable container 1403 can be removably installed on the base portion 1401 by sliding the removable container 1403 in the direction indicated in FIG. 17A onto the upper surface 1412 of the shelf 1402 such that the sides of the removable container 1403 are secured underneath respective ridges 1417 and 1419. In some embodiments, a stop can be provided, for example on one or both of the sides 1416, 1418 or on the upper surface 1412 of the shelf 1402 for preventing the removable container 1403 from being pushed back over the slots 1404 and 1406.

Figure 18B:
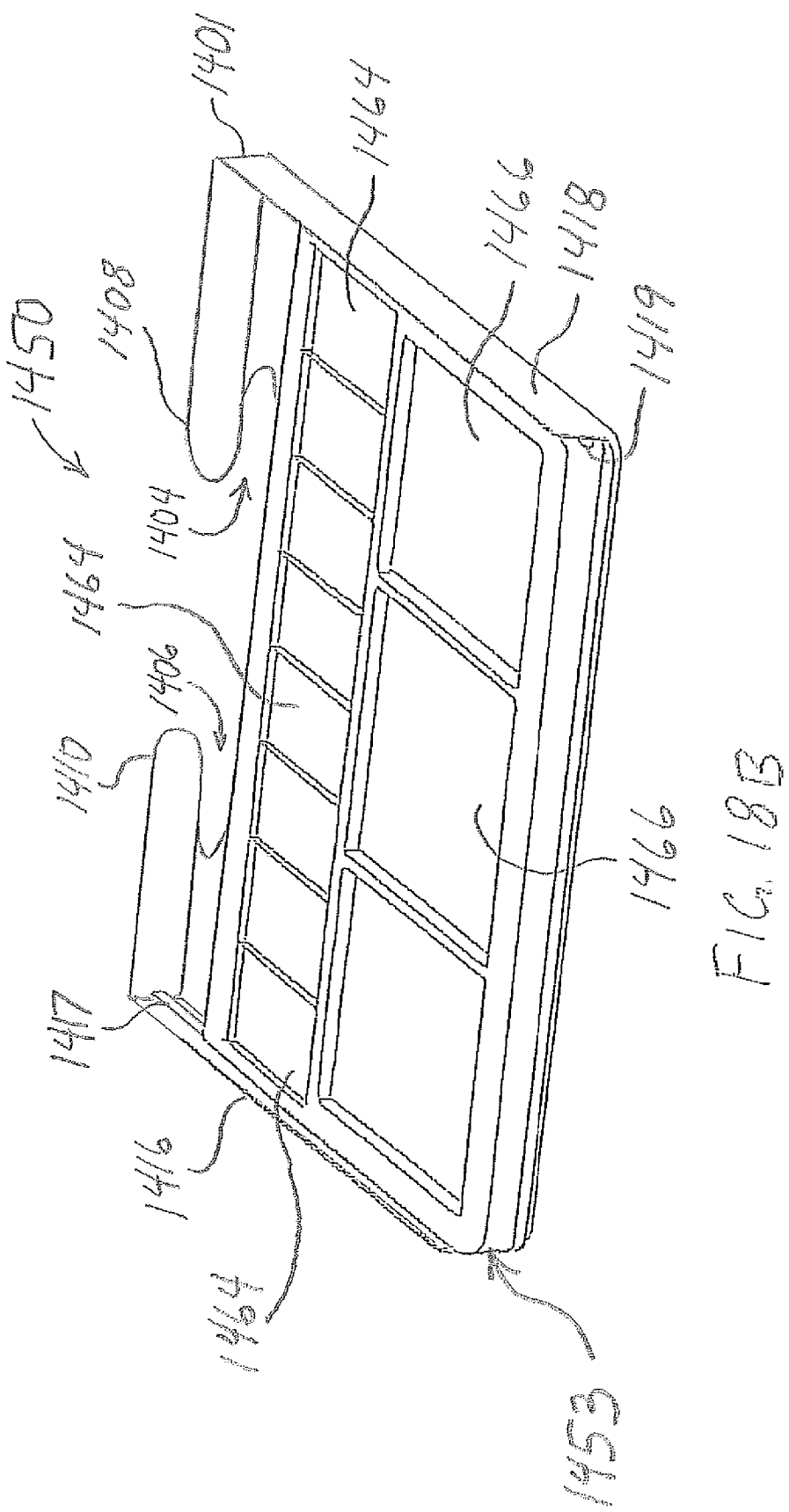

Turning next to FIGS. 18A and 18B, another example of an embodiment of a tray assembly having a sliding removable container is shown as tray assembly 1450. The tray assembly 1450 includes base portion 1401, which can be substantially the same as base portion 1401 described above in connection with FIGS. 17A and 17B, and therefore retains the same element number. The tray assembly 1450 also includes sliding removable container 1453.

The removable container 1453 can be very similar to removable container 1403, except that the removable container 1453 includes opposing side walls 1455 and 1457. Each of the side walls 1455 and 1457 includes a respective slot 1459, 1461. The slots 1459, 1461 are sized and positioned so as to align and mate with ridges 1419, 1417, respective, when the removable container 1453 is installed as shown in FIG. 18B. This configuration allows for deeper wells 1464, 1466 than those of removable container 1403. The removable container 1453 can be removably installed on the base portion 1401 by sliding the removable container 1453 in the direction indicated in FIG. 18A onto the upper surface 1412 of the shelf 1402 such that the slots 1459, 1461 are aligned with respective ridges 1419 and 1417. In some embodiments, a stop can be provided, for example on one or both of the sides 1416, 1418 or on the upper surface 1412 of the shelf 1402 for preventing the removable container 1453 from being pushed back over the slots 1404 and 1406.

Figure 19:
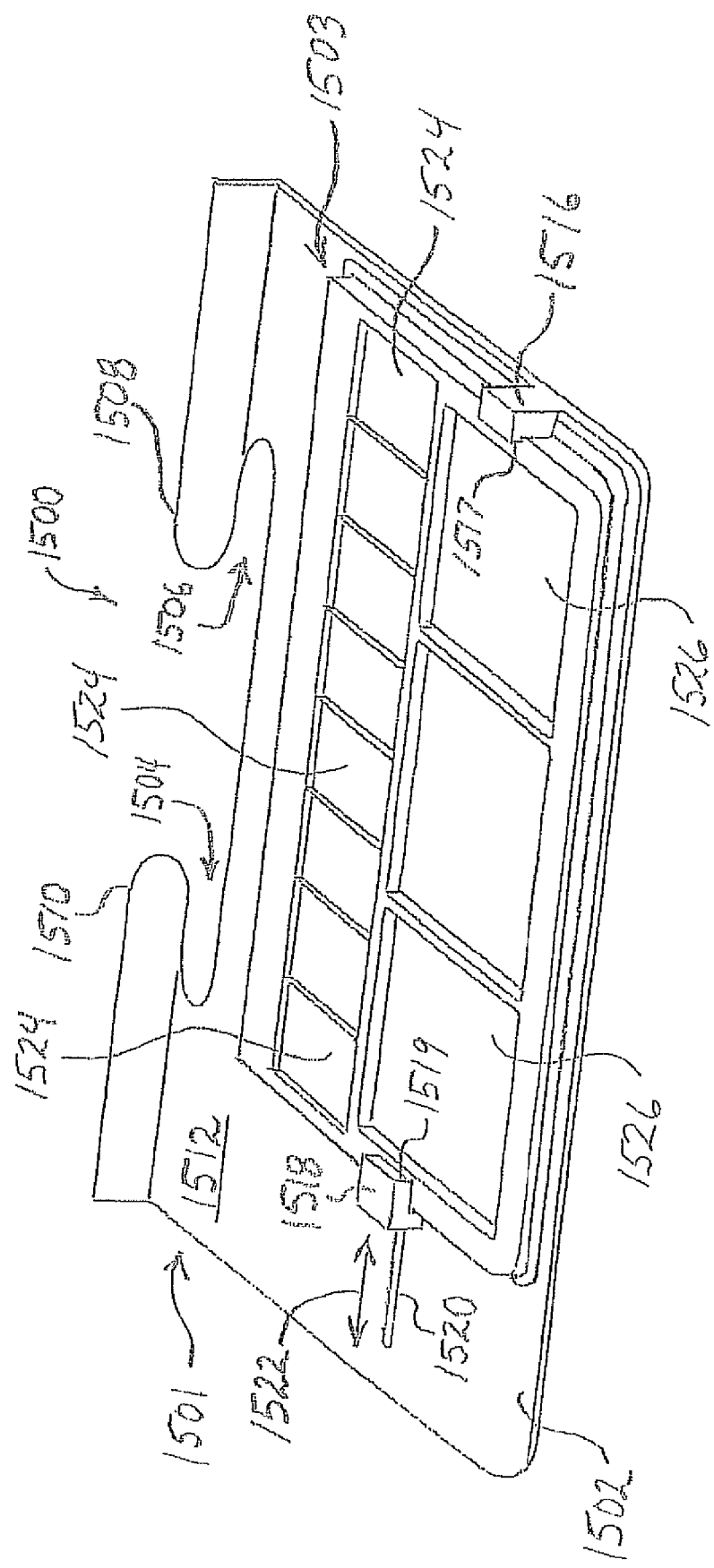
FIG. 19 shows a perspective view of an alternative tray assembly comprising a base portion and a removable container.

Turning next to FIG. 19, another embodiment is shown and generally designated as tray assembly 1500 having a base portion 1501 and a removable container 1503.

The base portion 1501 can be similar to the tray assembly 100 (FIGS. 1 and 2) such that the description of tray assembly 100 applies equally to the base portion 1501 of tray assembly 1500, except for differences that are described below. For example, the base portion 1501 includes a shelf 1502 configured to be mounted onto tripod legs at slots 1504 and 1506 and supported in a cantilever fashion by a pair of support tabs 1508 and 1510 in a manner as described above in connection with tray assembly 100. The base portion 1501 also includes a pair of side restraints 1516 and 1518 that extend upwardly from an upper surface 1512 of the shelf 1502. The side restraint 1516 is a fixed restraint, meaning that side restraint 1516 is fixed in place. The side restraint 1518 is an adjustable restraint, meaning that side restraint 1518 can slide relative to the shelf 1502 in the directions indicated by arrow 1519. A slot 1520 extends through the shelf 1502. The adjustable side restraint 1518 extends through the slot 1520 and can be selectively locked into any position along the slot 1520. This can be accomplished using any known locking mechanism. For example, the side restraint 1518 can be provided with a threaded bolt that extends through the slot 1520, and a wing nut that can be loosen for moving the side restraint 1518 along the slot 1520, then tightened for locking the side restraint 1518 into a desired position along the slot 1520.

The removable container 1503 can be similar to removable container 1403 and/or 1452. The removable container 1503 can be a shallow, rigid container suitable for carrying or holding things. The container 1503 can include a plurality of small wells 1524 and a plurality of large wells 1526. The properties of the wells 1524 and 1526, such as the arrangement, shape, number, size, and depth of the wells 1524 and 1526, are shown in FIG. 19 merely as an example, and can vary. Also, in some embodiments, one or more of the wells 1524, 1526 can include covers, such as removable or hinged covers as described above in connection with tray assembly 900. The embodiment shown in FIG. 19 is particularly useful for painting, where small wells 1524 can be used for different colors of paint, while large wells 1526 can be used for mixing colors, can be used as a sponge well, or can be used for holding a container that stores other art supplies, such as brushes or rags. It should be appreciated, however, that these are merely examples of uses for the wells 1524 and 1526.

In some embodiments, the wells 1524 and 1526 can be formed directly into the removable container 1503. For example, in embodiments where the removable container 1503 is formed of plastic, the wells 1524 and 1526 can be formed using known vacuum or injection molding techniques. In embodiments where the removable container 1503 is formed of metal, the wells 1524 and 1526 can be formed by known molding or stamping techniques. These are but a few examples of the numerous methods that can be employed for manufacturing the removable container 1503.

The side restraints 1516 and 1518 are L-shaped members, each having a respective ridge 1517, 1519 that extends inwardly towards each other. The removable container 1503 can have a height that corresponds to the distance between the ridges 1517, 1519 and the upper surface 1512 of the shelf 1502. This allows the removable container 1503 to fit between the ridges 1517, 1519 and the upper surface 1512 of the shelf 1502 as shown in FIG. 19. Thus, the removable container 1503 can be removably installed on the base portion 1501 by sliding the adjustable restraint 1518 away from the fixed restraint 1516, placing the removable container 1503 in position such that a portion of the removable container 1503 is disposed between the ridge 1517 and the upper surface 1512 of the shelf 1502, then moving the adjustable restraint 1518 towards the removable container 1503 until a portion of the removable container 1503 is disposed between the ridge 1519 and the upper surface 1512 of the shelf 1502, then locking the adjustable restraint 1518 in place. It will thus be appreciated that the embodiment shown in FIG. 19 allows for securing a variety of removable containers other than removable container 1503 to the base portion 1501, where other removable containers have other widths.

Figure 20B:
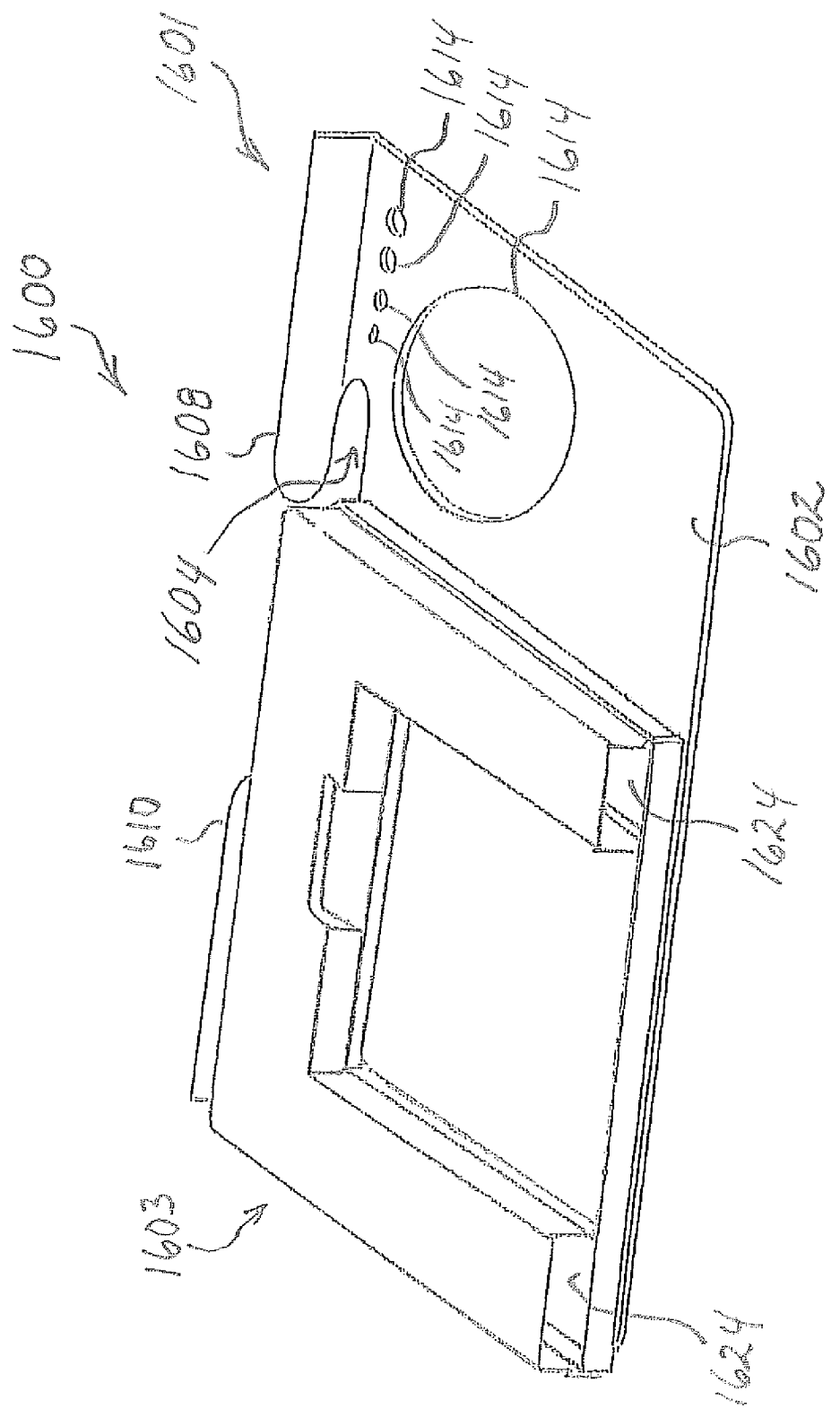

Turning next to FIGS. 20A and 20B, another alternative embodiment is shown and generally designated as tray assembly 1600. The tray assembly 1600 includes a base portion 1601 and a removable cover 1603.

The base portion 1601 can be similar to any of the tray assemblies or removable containers described herein, particularly those that include one or more wells, such as tray assembly 700 (FIG. 7) or removable container 1403 (FIGS. 17A and 17B). For example, the base portion 1601 includes a shelf 1602 configured to be mounted onto tripod legs at slots 1604 and 1606 and supported in a cantilever fashion by a pair of support tabs 1608 and 1610 in a manner as described above, for example in connection with tray assembly 700.

The base portion 1601 includes a plurality of holes 1614. The holes 1614 can vary in size as shown in FIGS. 20A and 20B. In some embodiments, such as embodiments where the tray assembly 1600 is intended for use as an artist's tray, the size and shape of the holes 1614 can be configured so as to be useful for holding various paint brushes, paint containers, water containers, or other art tools. In other embodiments, such as embodiments where the tray assembly 1600 is intended for use as a photographer's tray, the size and shape of the holes 1614 can be configured so as to be useful for holding various camera lenses, film containers, or other camera accessories. In still other embodiments, such as embodiments where the tray assembly 1600 is intended for use with a telescope, the size and shape of the holes 1614 can be configured so as to be useful for holding various telescope lenses, a compass, lens caps, or other telescope accessories. It should be appreciated that in still further embodiments, any number of holes 1614 of various shapes and sizes can be provided for various uses. It should also be noted that one or more wells of various size, shape, and depth can be formed in place of, or in addition to, the holes 1614.

The base portion 1601 also includes a well region 1618 bound by well region wall 1620. The well region 1618 comprises a plurality of small wells 1624 and a plurality of large wells 1626. The properties of the wells 1624 and 1626, such as the arrangement, shape, number, size, and depth of the wells 1624 and 1626, are shown in FIG. 20A merely as an example, and can vary. Also, in some embodiments, one or more of the wells 1624, 1626 can include covers, such as removable or hinged covers as described above in connection with tray assembly 900. The embodiment shown in FIGS. 20A and 20B is particularly useful for painting, where small wells 1624 can be used for different colors of paint, while large wells 1626 can be used for mixing colors, can be used as a sponge well, or can be used for holding a container that stores other art supplies, such as brushes or rags. It should be appreciated, however, that these are merely examples of uses for the wells 1624 and 1626.

The removable cover 1603 is sized and shaped so as to fit snugly about the well region wall 1620. This allows the removable cover 1603 to be lowered onto the well region 1618 and pressed into place over the well region 1618 as shown in FIG. 20B. The removable cover 1603 can alternatively include one or more snaps, latches, or other securing means for removably securing the removable cover 1603 over the well region 1618.

While the shelves of the various embodiments of tray assemblies disclosed herein are shown in the figures as being generally rectangular in shape, it should be appreciated that still further embodiments can be provided with other shapes, such as more round or oval shapes.

In some embodiments, the upper shelf surface can be substantially smooth. In other embodiments, the upper shelf surface can be rough and textured. In some embodiments, the upper shelf surface can be formed so as to have a high friction coefficient so as to prevent items from sliding.

A tray assembly according to any of the disclosed embodiments can be any desired color and/or provided with decorative patterns or designs, including various degrees of transparency.

It is apparent that an invention with significant advantages has been described and illustrated. Although the present invention is shown in a limited number of forms, it is not limited to just these forms, but is amenable to various changes and modifications without departing from the spirit thereof.

We claim:

1. A removable tray assembly for use with a tripod, the removable tray assembly comprising:
   a shelf having a back edge, a front edge, a first side edge, a second side edge, a lower surface_and an upper surface, at least a portion of the upper surface defining a first planar surface that is substantially planar;
   a first support tab, at least a portion of the first support tab defining a second planar surface that is substantially planar, wherein the second planar surface is non-coplanar with the first planar surface;
   a second support tab, at least a portion of the second support tab defining a third planar surface that is substantially planar, wherein the third planar surface is non-coplanar with the first planar surface;
   a first slot disposed between the back edge of the shelf and the first support tab for receiving a first leg of the tripod, the first slot being at least partially bound by the first planar surface and the second planar surface;
   a second slot disposed between the back edge of the shelf and the second support tab for receiving a second leg of the tripod, the second slot being at least partially bound by the first planar surface and the third planar surface;
   a well supported by the shelf, the well being bound by one or more side walls that are non-coplanar with the first planar surface; and
   a support attached to the lower surface of the shelf, the support being adapted for supporting a removable container;
   a first side wall attached to the first side edge, the first side wall having a first ridge, the first side wall extending in a direction substantially normal relative to the first planer surface of the shelf;
   a second side wall attached to the second side edge, the second side wall having a second ridge, the second side wall extending in a direction substantially normal relative to the first planer surface of the shelf; and
   a removable tray adapted to slidingly engage with the first ridge and the second ridge for attaching the removable tray to the shelf;
   wherein the removable container engages with the support to a position directly underneath the shelf,
   wherein the well is formed in the removable container, and
   wherein the first and second support tabs are arranged so as to support the shelf in a cantilever fashion when the tray assembly is installed onto the tripod.

2. The removable tray assembly according to claim 1, further comprising a plurality of holes of different sizes through the shelf.

3. The removable tray assembly according to claim 1, further comprising at least one side wall extending along one of the side edges of the shelf.

4. The removable tray assembly according to claim 1, wherein the shelf and support tabs are formed from a plastic sheet.

5. The removable tray assembly according to claim 1, wherein the shelf and support tabs are formed from Acrylonitrile Butadiene Styrene.

6. The removable tray assembly according to claim 1, further comprising at least one projection that extends within a notch formed in one of the side edges.

7. The removable tray assembly according to claim 1, further comprising at least one cover hingedly attached to the shelf for selectively covering the well.

8. The removable tray assembly according to claim 1, wherein the container is a collapsible cup.

9. The removable tray assembly according to claim 1, wherein the removable container is slidably removable.

10. The removable tray assembly according to claim 1, wherein the well is one of a plurality of wells, and wherein the removable tray assembly further comprises a removable cover for selectively covering the plurality of wells.

11. The removable tray assembly according to claim 1, wherein the support comprises:
   a first support member and an opposing second support member,
   wherein the first support member and the second support member are manufactured in a L-shaped configuration for engaging with a shoulder of the container.

* * * * *